US011592086B2

United States Patent
Martyn

(10) Patent No.: US 11,592,086 B2
(45) Date of Patent: Feb. 28, 2023

(54) APPARATUS FOR CONVERTING MOTION

(71) Applicant: Konrad Prefab LLC, North Springfield, VT (US)

(72) Inventor: David Martyn, Wallingford (GB)

(73) Assignee: Konrad Prefab LLC, North Springfield, VT (US)

( * ) Notice: Subject to any disclaimer, the term of this patent is extended or adjusted under 35 U.S.C. 154(b) by 0 days.

(21) Appl. No.: 17/234,599

(22) Filed: Apr. 19, 2021

(65) Prior Publication Data
US 2021/0239196 A1     Aug. 5, 2021

Related U.S. Application Data

(62) Division of application No. 15/506,208, filed as application No. PCT/GB2015/052260 on Aug. 5, 2015, now Pat. No. 11,009,109.

(30) Foreign Application Priority Data

Aug. 29, 2014 (GB) ...................................... 1415373

(51) Int. Cl.
*F16H 21/44* (2006.01)
*F16H 21/04* (2006.01)

(52) U.S. Cl.
CPC ............. *F16H 21/44* (2013.01); *F16H 21/04* (2013.01)

(58) Field of Classification Search
CPC ........... F16H 21/02; F16H 21/04; F16H 21/44
USPC ...................................................... 74/99 R
See application file for complete search history.

(56) References Cited

U.S. PATENT DOCUMENTS

| 388,858 | A | 9/1888 | Gose |
| 822,842 | A | 6/1906 | Holm |
| 2,445,004 | A | 7/1948 | Renolds et al. |
| 2,506,151 | A | 5/1950 | Hoven et al. |

(Continued)

FOREIGN PATENT DOCUMENTS

| DE | 19542229 A1 | 5/1997 |
| EP | 0158722 B | 10/1985 |

(Continued)

OTHER PUBLICATIONS

Straight line mechanism of James Watt: Wattt's linkage https://en.wikipedia.org/wiki/Watt%27s_linkage 4 pages, Dec. 19, 2015.

(Continued)

*Primary Examiner* — Joseph Brown

(57) ABSTRACT

An assembly for converting motion comprises a first arm and a second arm rotatable about first and second fixed pivots; a third arm pivotably connected to the second arm; a first connecting arm pivotably connected to and extending between the first arm and the third arm; a second connecting arm pivotably connected to and extending between the first arm and the second arm; and a locking assembly comprising a first locking member and a second locking member, the first locking member connected to one of the arms and engaging with the second locking member at one or more positions from the retracted position to the extended position. The assembly may comprise the guide assembly comprising a guide member and an engagement member moveably engageable with the guide member.

16 Claims, 19 Drawing Sheets

(56) References Cited

U.S. PATENT DOCUMENTS

| | | | |
|---|---|---|---|
| 2,645,853 A | | 7/1953 | Kaufman |
| 2,697,845 A | | 12/1954 | Broner |
| 2,993,675 A | | 7/1961 | Tatter |
| 3,253,473 A | | 5/1966 | Chisholm |
| 3,291,431 A | * | 12/1966 | Daniel, Jr. ............ A47B 88/483 74/521 |
| 3,333,553 A | | 8/1967 | Krokos |
| 3,375,624 A | | 4/1968 | Mikulin |
| 3,426,994 A | | 2/1969 | Daniel, Jr. |
| 3,501,120 A | * | 3/1970 | Daniel, Jr. ............ A47B 88/483 346/117 A |
| 3,557,500 A | | 1/1971 | Schmidt |
| 3,559,353 A | | 2/1971 | Partridge |
| 3,968,991 A | | 7/1976 | Maclaren |
| 4,130,178 A | | 12/1978 | Smith, Jr. |
| 4,248,103 A | | 2/1981 | Halsall |
| 4,400,985 A | | 8/1983 | Bond |
| 4,437,275 A | | 3/1984 | Zeigler |
| 4,736,641 A | * | 4/1988 | Reid ........................ E05D 15/06 49/324 |
| 4,747,353 A | | 5/1988 | Watt |
| 4,819,399 A | | 4/1989 | Onoda |
| 5,102,290 A | | 4/1992 | Cipolla |
| 5,121,765 A | | 6/1992 | MacMorris, Jr. |
| 5,167,100 A | | 12/1992 | Krishnapillai |
| 5,219,410 A | | 6/1993 | Garrec |
| 5,237,887 A | | 8/1993 | Appleberry |
| 5,363,627 A | | 11/1994 | Wilson |
| 5,485,763 A | | 1/1996 | Pincus |
| 6,141,934 A | | 11/2000 | Ziegler |
| 6,910,533 B2 | | 6/2005 | Guerrero |
| 8,813,455 B2 | | 8/2014 | Merrifield |
| 9,376,800 B2 | | 6/2016 | Martyn |
| 9,528,579 B2 | | 12/2016 | Martyn |
| 2005/0204681 A1 | | 9/2005 | Zeigler |
| 2008/0229852 A1 | | 9/2008 | Hachuda |
| 2016/0186842 A1 | | 6/2016 | Martyn |
| 2016/0195175 A1 | | 7/2016 | Martyn |
| 2017/0241523 A1 | | 8/2017 | Martyn |

FOREIGN PATENT DOCUMENTS

| | | | | |
|---|---|---|---|---|
| FR | 2243375 A1 | | 4/1975 | |
| FR | 2557003 A1 | | 6/1985 | |
| FR | 2571805 A1 | * | 4/1986 | ............ F16H 21/04 |
| GB | 2437494 A | | 10/2007 | |
| GB | 2502788 A | | 12/2013 | |
| GB | 2505206 A | | 2/2014 | |
| GB | 2505676 A | | 3/2014 | |
| GB | 2514175 A | | 11/2014 | |
| JP | 2003065415 A | | 3/2003 | |
| SU | 1044871 A1 | | 9/1983 | |
| WO | 199733725 A1 | | 9/1997 | |
| WO | 199914018 A1 | | 3/1999 | |
| WO | 2013182834 A1 | | 12/2013 | |

OTHER PUBLICATIONS

Linkage of Tchebicheff: Chebyshev linkage https://en.wikipedia.org/wiki/Chebyshev_linkage 3 pages, Jan. 9, 2016.

Peaucellier-Lipkin inversor: Peaucellier-Lipkin linkage https://en.wikipedia.org/wiki/Peaucellier%E2%80%93Lipkin_linkage 4 pages, Jan. 28, 2016.

Mechanism of Hart: Hart's inversor https://en.wikipedia.org/wiki/Hart%27s_inversor 1 page, Feb. 5, 2016.

Scott Russell linear converter: Scott Russell linkage https://en.wikipedia.org/wiki/Scott_Russell_linkage 1 page, Oct. 14, 2015.

Dijksman, E.A., "True Strail-line Linkages Having a Rectilinear Translating Bar", Advances in Robot Kinematics and Computationed Geometry, pp. 411-420.1994, Kluwer Academic Publishers.

Patents Act 1977: Search Report under Section 17, application No. GB1415354.8, dated Mar. 4, 2015, 2 pages.

Patents Act 1977: Search Report under Section 17, application No. GB1315702.9, dated Mar. 28, 2014, 2 pages.

International Search Report, PCT/GB2014/052609, dated Nov. 18, 2014, 4 pages.

International Search Report, PCT/GB2014/052639, dated Nov. 18, 2014, 5 pages.

International Search Report, PCT/GB2015/052270, dated Oct. 19, 2015, 4 pages.

International Search Report, PCT/GB2015/052260, dated Aug. 1, 2016, 6 pages.

Office action restriction requirement dated Nov. 20, 2018, U.S. Appl. No. 15/506,208, 6 pages.

Response to office action restriction requirement dated Nov. 20, 2018, U.S. Appl. No. 15/506,208, dated Dec. 13, 2018, 11 pages.

Office action dated Mar. 20, 2019, U.S. Appl. No. 15/506,208, 16 pages.

Final Office action dated Nov. 4, 2019, U.S. Appl. No. 15/506,208, 15 pages.

Advisory action before the filing of an appeal dated Jan. 10, 2020, U.S. Appl. No. 15/506,208, 3 pages.

Office action dated Apr. 17, 2020, U.S. Appl. No. 15/506,208, 12 pages.

Final Office action dated Oct. 28, 2020 U.S. Appl. No. 15/506,208, 6 pages.

* cited by examiner

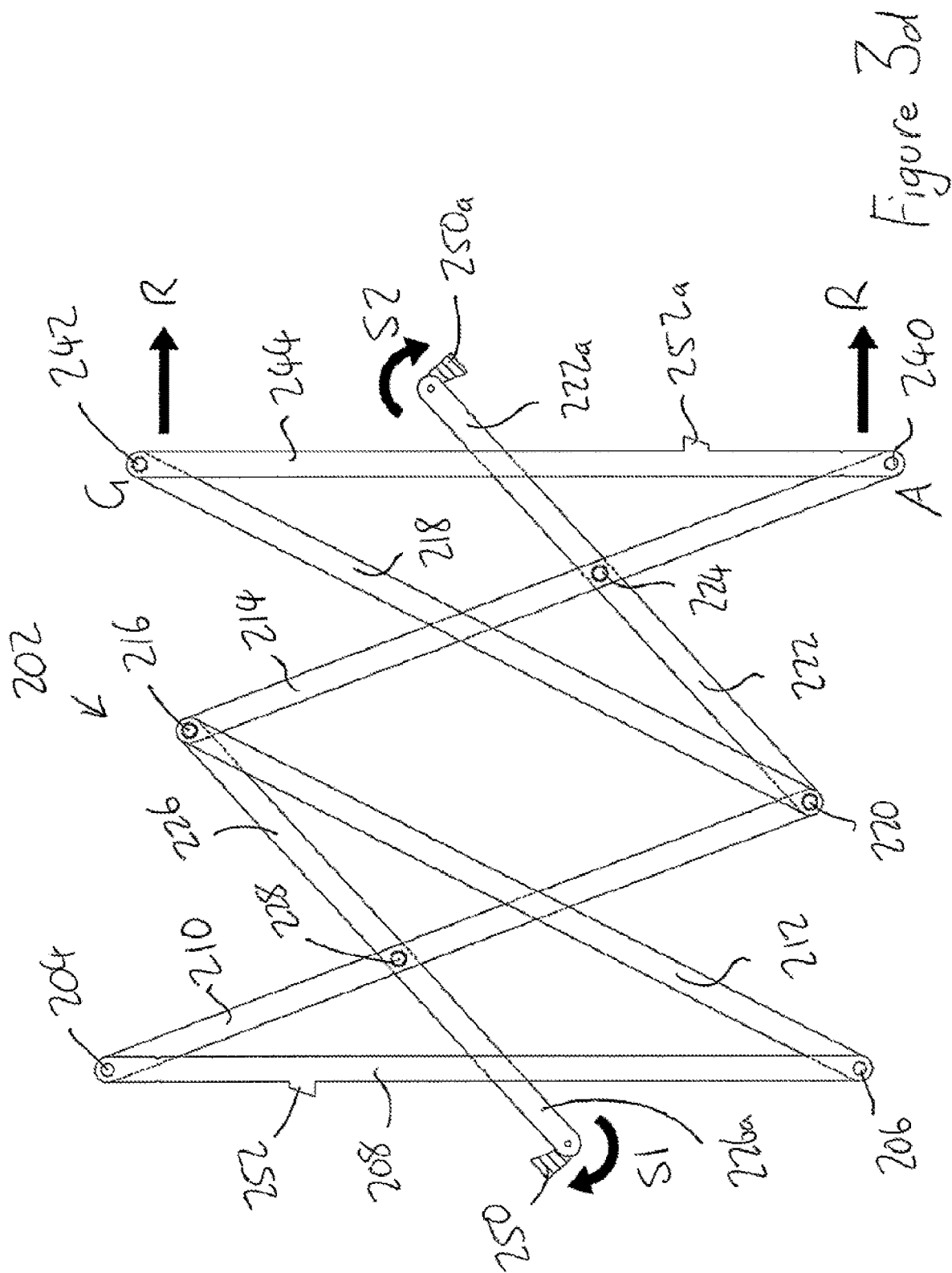

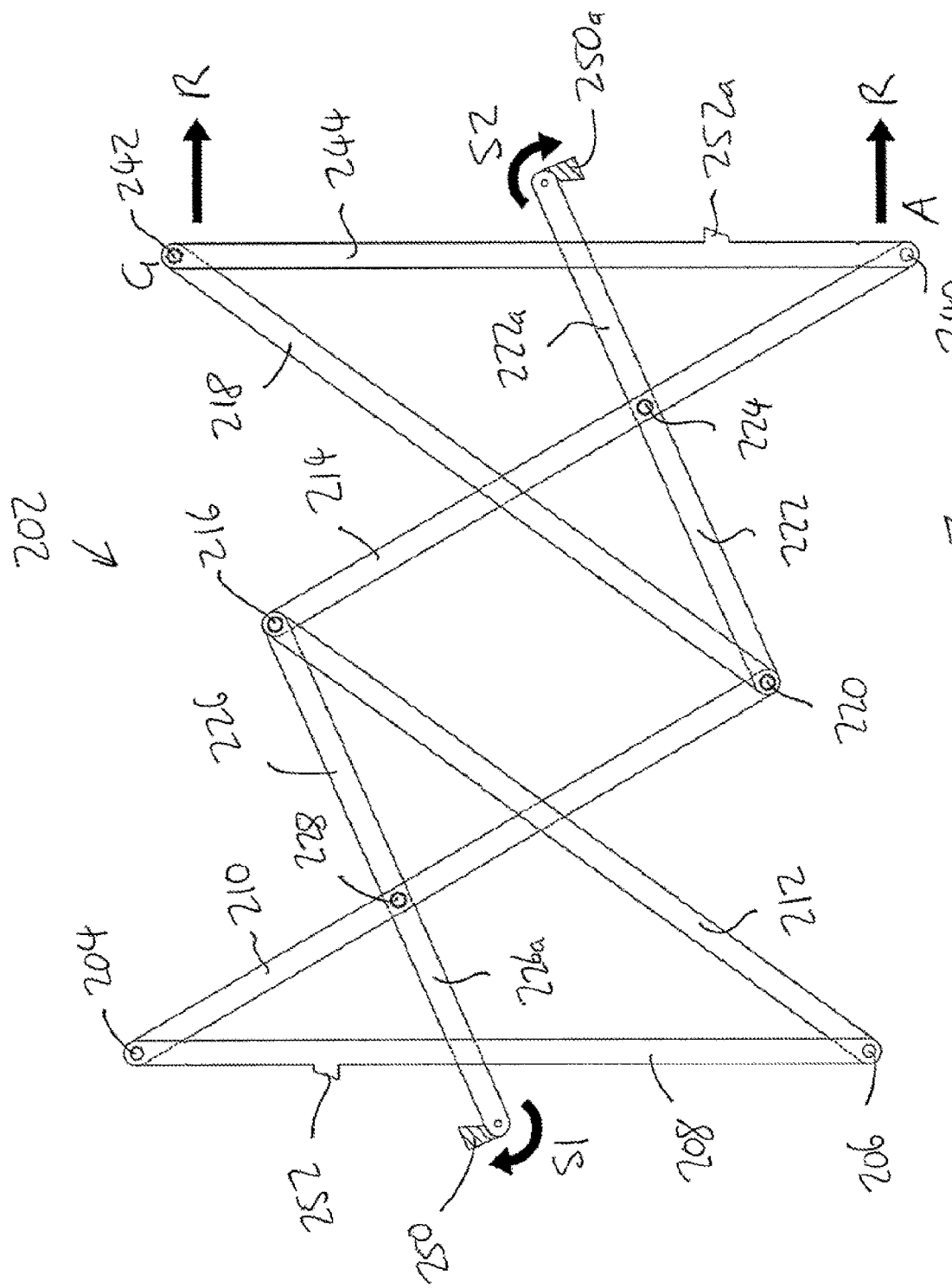

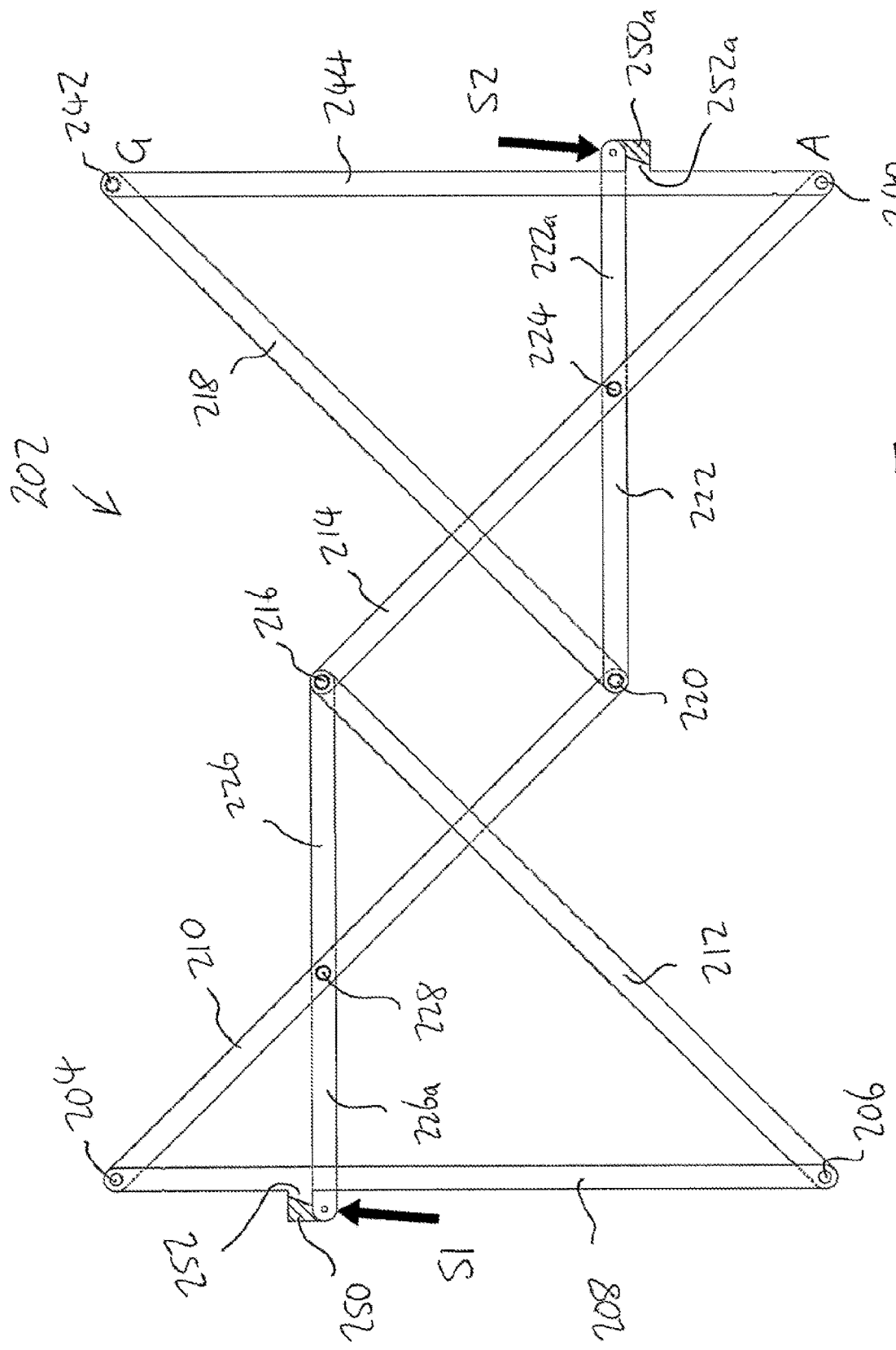

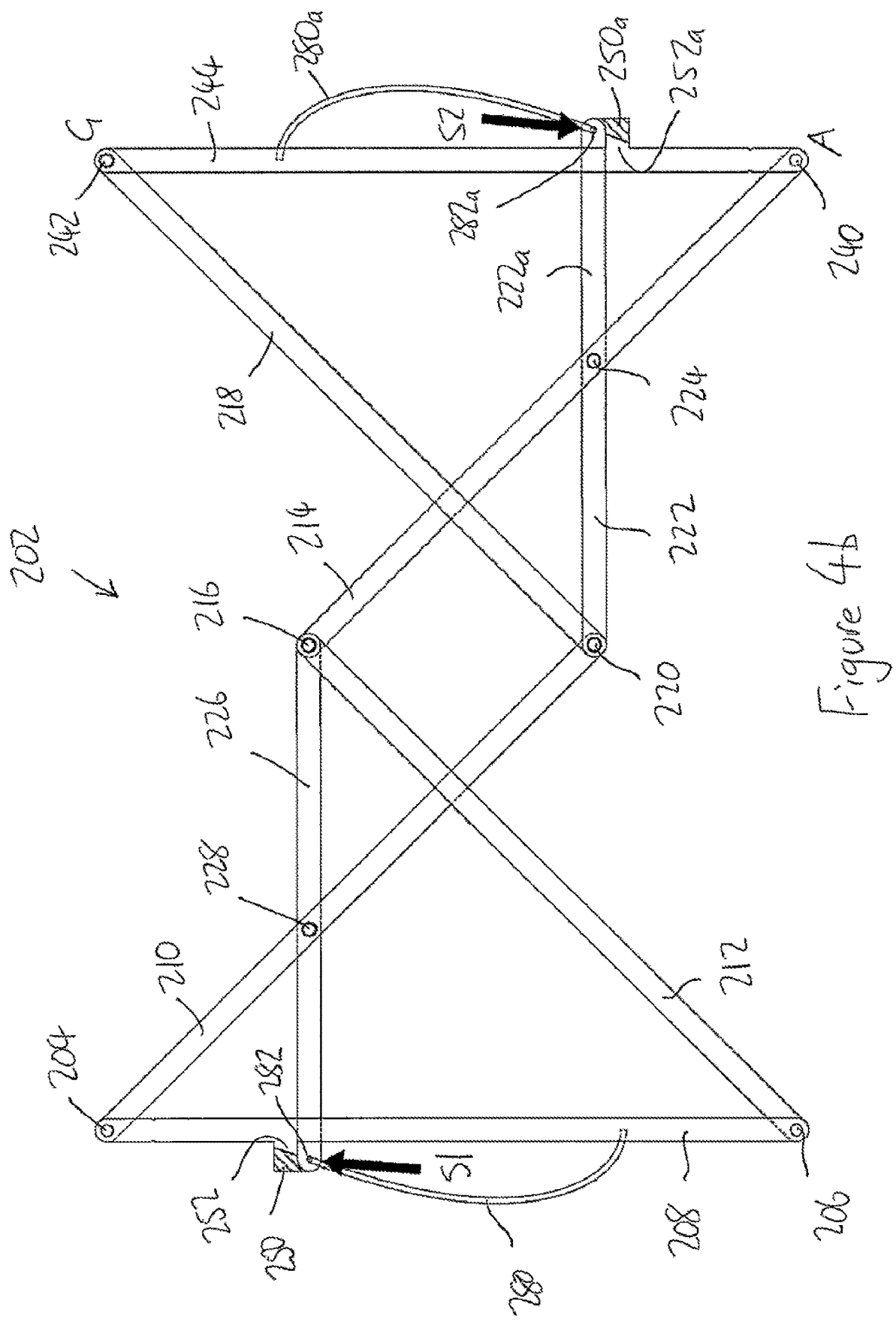

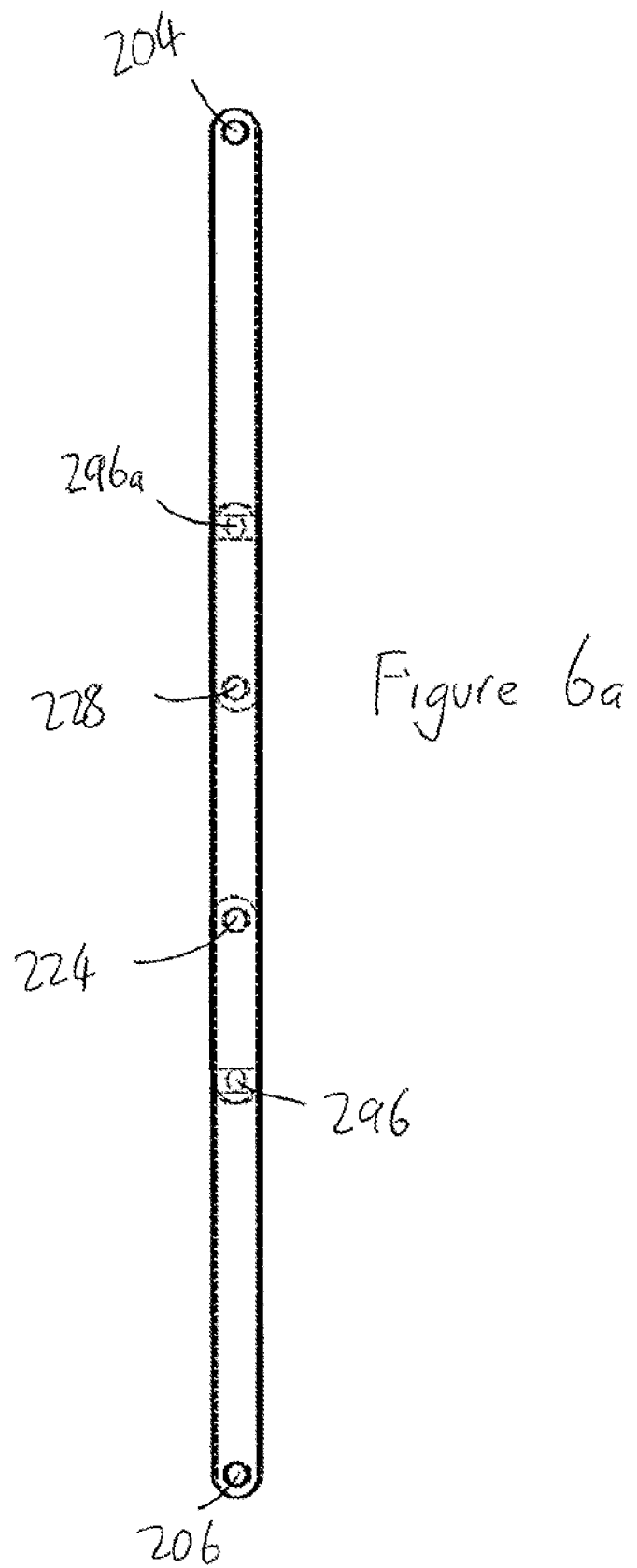

APPARATUS FOR CONVERTING MOTION

CROSS-REFERENCE TO RELATED APPLICATIONS

This application is a U.S. divisional patent application of Ser. No. 15/506,208, filed on Feb. 23, 2017, which is a 371 of PCT/GB2015/052260 filed on Aug. 5, 2015, which claims priority to GB application No. 1415373.8 filed Aug. 29, 2014.

BACKGROUND OF THE INVENTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of interconnected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for movement of the moveable member in a straight path with respect to the fixed member.

There is a need for an improved assembly for providing a straight line motion, in particular for providing an element moveable in a straight line in response to a rotational motion. It would be most advantageous if the assembly could be arranged in a compact form, thereby occupying only a small volume of space.

GB 2514175 discloses an apparatus for converting motion and a building assembly comprising the same.

An expandable building assembly comprising a rotating roof portion, operated by way of an assembly for converting motion, is disclosed in GB 2505676.

WO 2013/182834 discloses an assembly for converting motion. The assembly comprises a plurality of arms, in particular a first arm rotatable at a first position thereon about a first fixed pivot; a second arm rotatable at a first position thereon about a second fixed pivot, the second fixed pivot spaced apart from the first fixed pivot; a third arm pivotably connected at a first position thereon to the second arm at a second position on the second arm, the second position spaced apart from the first position on the second arm; a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm at a third position thereon. The assembly finds use in a range of applications, for example supporting and moving components of a building. In one embodiment described and shown in WO 2013/182834, the assembly is employed in deploying a solar panel array.

A modification to the assembly of WO 2013/182834 has now been found. This new assembly is also for converting a rotary motion into a straight line motion and relies upon an assembly of levers or arms having pivoted connections therebetween. However, the new assembly provides increased rigidity and stability of the assembly of WO 2013/182834, in turn increasing the range of uses of the assembly, thereby significantly increasing the utility of the earlier assembly.

BRIEF SUMMARY OF THE INVENTION

According to the present invention, there is provided in a first aspect an assembly for converting motion, the assembly moveable between a retracted position and an extended position, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm;

the assembly further comprising a locking assembly comprising a first locking member and a second locking member, the first locking member connected to one of the first, second or third arms or one of the first or second connecting arms and engaging with the second locking member at one or more positions from the retracted position to the extended position.

It has been found that the assembly of WO 2013/182834 can be improved by providing a locking assembly, by which one or more of the arms of the assembly may be locked at one or more positions from the retracted position to the extended position. In particular, it has been found that the strength of the assembly in a position in which it is locked is greatly increased by the use of the locking assembly. More particularly, it has been found that the load bearing capacity of the assembly is significantly increased by the presence of the locking assembly, compared with when the locking assembly is not present, as is the case with the specific assembly disclosed in WO 2013/182834. This is particularly the case where the locking assembly is disposed such that the extent to the which the assembly is triangulated when locked is increased.

In operation of the assembly, the first arm rotates about the first fixed pivot, the second arm rotates about the second fixed pivot and the third arm moves. In particular, in use of the assembly the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The assembly of the present invention provides a number of significant advantages, in particular compared with the linkages and mechanisms of the prior art, such as those discussed above. First, in preferred embodiments of the assembly, the said point on the third arm moves in a substantially straight line extending perpendicular to the line joining the first and second fixed pivots. This is a particularly advantageous arrangement, for example when employing the assembly in a building to provide movement of one portion of the building with respect to another, such as moving a portion of the building laterally from a fixed building structure.

Second, the assembly of the present invention may be arranged such that the arms of the assembly are accommodated one within the other in a very compact configuration, for example all lying between the first and second fixed pivots. This compactness is a significant advantage of the assembly of this invention.

Further, the said point on the third arm may be arranged to always be the forwardmost point of the assembly in the direction of motion of the said point. This arrangement provides significant advantages over known assemblies, where the point moving in a straight line is contained within or otherwise surrounded by other components of the assembly.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first, second and third positions on the third arm, for example with the said point being located at the free end of the third arm or in an end portion at the free end of the arm.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the third arm describes an approximate straight line of 2750 mm in length. In particular, the said point moves between a first or retracted position and a second or extended position. In this respect, references to motion of the said point are with respect to the line joining the first and second fixed pivots, with the retracted position being at or close to the line joining the first and second fixed pivots and the retracted position being distant therefrom. As noted, the said point on the third arm moves between the retracted position and the extended position, with the line joining the retracted and extended positions being a straight line perpendicular to the line extending between the first and second pivots. However, in moving between the retracted and extended positions, the said point follows a sine wave having a maximum deviation from the straight line of 8 mm. This deviation represents a deviation of just 0.25% of the distance travelled by the said point between the retracted and extended positions and is generally insignificant in the context of most if not all practical applications of the assembly.

In another embodiment of the assembly in which the distance between the first fixed pivot and the second fixed pivot is 3250 mm, the said point on the third arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the third arm follows a substantially straight line. Other points on the third arm follow a respective arc.

It has been found that the aforementioned assembly provides a number of significant advantages. First, the point of the assembly that traces a straight line moves away from the mechanism, that is leads the mechanism in the direction of motion of the said point. As noted, the assembly may be considered to be movable from a retracted position to an extended position, with a point on the third arm moving in a straight line between the retracted and extended positions. The point on the third arm moves in a straight line away from the retracted position to the extended position. In particular, the assembly is such that, in operation, a point on the third arm traces a straight line that extends away from the first and second fixed pivot points, in particular from the line joining the first and second pivot points.

More particularly, in many embodiments, the straight line path followed by the said point on the third arm extends perpendicular to the line joining the first and second pivot points. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

Further, the arms of the assembly may be constructed such that the arms may be accommodated one within another. The components of the assembly may be arranged such that, when in the retracted position, the third arm and first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted above, the assembly of the present invention provides a motion of the said point on the third arm that follows a straight line over a specific extent of its movement. The close approximation of the movement of the said point on the third arm to a straight line between the retracted and extended positions makes the assembly of the present invention particularly useful as a straight line converter, that is able to convert a rotational movement of the first and/or second arms about the first and second fixed pivots respectively, into a straight line motion of the said point on the third arm. However, the operation of the assembly is not limited to this extent of movement of the third arm. Rather, continued movement of the assembly beyond the extended position to a super-extended position causes the third arm to move to a position that is perpendicular to and displaced from the line joining the first and second fixed pivots. This movement of the third arm away from the line joining the first and second fixed pivots with simultaneous rotation of the third arm, once beyond the extended position, is also particularly useful, for example in deploying items connected to the third arm away from the line joining the first and second fixed pivots. Indeed, it has been found that the third arm may be moved to a position in which it extends at any desired angle to the line joining the first and second pivots, in particular up to and including perpendicular to the line. This is a further advantageous aspect of the assembly of the present invention, in particular compared with assemblies of the prior art, which have only limited movement of the components.

As noted, operation of the assembly results in motion of the third arm. It is to be understood that the assembly may be used to convert a rotational motion of the first or second arms about the first or second fixed pivots into a motion of the said point on the third arm, that is by having drive to the assembly provided at the first or second arms. Alternatively, the assembly may be used to convert a motion of the third arm into a rotational motion of the first and second arms, that is by having drive to the assembly applied at the third arm.

As noted above, the assembly of the present invention is mounted to fixed pivots. In particular, the first and second arms are mounted for rotation about respective first and second fixed pivots. The first and second fixed pivots are points at which the assembly is mounted to a supporting structure. For example, the supporting structure may comprise a frame or other arrangement of support members having the first and second fixed pivots thereon. In other embodiments, the assembly is mounted to a fixed structure, for example a building, with the first and second fixed pivots being provided thereon.

As noted above, the assembly moves in a plane containing the first and second fixed pivots. The first and second fixed pivots may each be arranged on the fixed structure or supporting structure at a suitable position to provide the movement of the assembly in the required direction and in the required plane. The assembly may be arranged to move in any plane. For example, the first and second fixed pivots may be arranged to have the assembly move in a vertical plane. Similarly, the fixed pivots may be arranged to provide movement of the third arm in the required direction, in particular movement of the said point on the third arm. In many embodiments, the said point on the third arm moves substantially horizontally or substantially vertically. For example, for moving many components or structure, the said point on the third arm moves horizontally away from or towards the line joining the first and second fixed pivots.

In one preferred arrangement finding many applications, the first and second fixed pivots are arranged on a substantially vertical line. In this case, the assembly moves in a substantially vertical plane. Also, in this case, the said point on the third arm moves horizontally.

The first fixed pivot may be arranged to be higher or lower than the second fixed pivot. Alternatively, the fixed pivots may be arranged to be at the same height. For example, with the first and second fixed pivots arranged on a substantially vertical line, the first fixed pivot may be above the second fixed or vice versa.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move. The first position may be in any suitable location on the arm. In one preferred embodiment, the first position is at or adjacent one end of the arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move. The first position may be in any suitable location on the second arm. In one preferred embodiment, the first position is at or adjacent one end of the second arm.

The second arm is moved about the second fixed pivot under the action of either movement of the first arm or the third arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and extended positions. This point on the third arm is spaced apart from the first position on the third arm, that is the position on the third arm at which the second and third arms are pivotably connected together. The third arm may be a driven arm, that is moved under the action of movement of the first and second arms. In this case, rotation of the first arm about the first fixed pivot causes the third arm to move, such that the said point on the third arm follows the straight line path between the retracted and extended positions. Alternatively, the third arm may be a driving arm, that is have a force applied thereto resulting in movement of the third arm, which in turn drives the other components of the assembly to result in movement of the first arm about the first fixed pivot. For example, application of a straight line force to the said point on the third arm between the retracted and extended positions results in rotational movement of the first arm about the first fixed pivot.

The distance between the first and second fixed pivots and the lengths of the first, second and third arms may be selected according to the desired movement of the components to be achieved and the particular application of the assembly.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. In this way, the first arm may be accommodated between the first and second fixed pivots, when the assembly is in the retracted position. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. In this way, the second arm may be accommodated between the first and second fixed pivots, when the assembly is in the retracted position. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second position on the second arm moves about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. The length of the third arm is preferably less than the distance between the first and second fixed pivots. In this way, the third arm may be accommodated between the first and second fixed pivots, when the assembly is in the retracted position. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm has a length of about 0.975. In alternative embodiments, the length of the third arm is the same as that of the first arm and/or the second arm. In one particularly preferred arrangement, the first, second and third arms are the same length.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a second position on the first arm. The second position on the first arm is spaced apart from the first position on the first arm. In one preferred embodiment, the second position on the first arm is at or adjacent the second end of the first arm.

The first connecting arm is further connected to the third arm at a second position on the third arm, which second position is spaced apart from the first position on the third arm.

The first connecting arm may have any suitable length. For example, the length of the first connecting arm is the distance between the positions on the first and third arms between which the first connecting arm extends. Alternatively, the first connecting arm may extend beyond the one or both of the first and third arms, for example beyond the third arm in the direction away from the line joining the first and second fixed pivots.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.41 to about 0.47.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the first connecting arm and/or the pivotable connection between the second connecting arm and the second arm is at or adjacent the second end of the second connecting arm.

The second connecting arm is connected to the first arm at a third position on the first arm, which third position is spaced apart from and between both the first and second positions on the first arm.

The third position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the second connecting arm is a factor in determining the location of the third position on the first arm. Second, as with the first connecting arm, the overall strength and stability of the assembly is related to the length of the second connecting arm, with the strength and stability reducing as the length of the second connecting arm increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The second connecting arm is further connected to the second arm at a third position on the second arm. In one embodiment of the assembly, the third position is spaced apart from and between the first and second positions on the second arm. In an alternative embodiment, the third position on the second arm coincides with the second position on the second arm, such that the second connecting arm is connected to both the second and third arms. This arrangement has the advantage of being particularly compact.

The third position on the second arm is at or spaced from the second position on the second arm and may be at any suitable position. In particular, the ratio of the distance between the first position and the third position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the third position on the second arm and the distance between the first position and the second position on the second arm about 0.95 to 1.0.

The second connecting arm may have any suitable length. Its length is preferably the distance between the positions on the first and second arms between which the second connecting arm extends.

The assembly may comprise one or more additional connecting arms, in particular extending between and pivotally connected to the arms of the assembly in analogous manner to the first and second connecting arms described above. In one preferred embodiment, the assembly comprises a third connecting arm extending between and pivotally connected to the second arm and the third arm, more preferably disposed between the first and second connecting arms.

The arms of the assembly of the present invention may consist essentially of the first, second and third arms and first and second connecting arms described hereinbefore. Alternatively, the assembly may comprise one or more further arms connected to the aforementioned arms. Further arms may be added, for example, to provide additional support to one or more components being moved by the assembly and connected thereto.

In one preferred embodiment, the assembly comprises a fourth arm pivotably connected at a first position thereon to the first arm at a fourth position on the first arm.

The fourth arm may have any shape and configuration. A preferred form for the fourth arm is an elongate member, for example a bar or a rod. The fourth arm is pivotably mounted at a first position on the fourth arm to the first arm at a fourth position on the first arm. The pivotable connection between the first and fourth arms may be of any suitable form, preferably a pin, spindle or axle passing through the arms about which one or both of the arms are free to move.

The fourth arm is pivotably connected to the first arm at a first position on the fourth arm and a fourth position on the first arm. The first position may be in any suitable location on the fourth arm. In one preferred embodiment, the first position is at or adjacent one end of the fourth arm, in particular the end of the fourth arm that is proximal to the first and second fixed pivots.

The fourth position on the first arm is spaced apart from the first position on the first arm. In one preferred embodiment, the fourth position on the first arm is at or adjacent the second end of the first arm, that is the end distal of the first fixed pivot. In a particularly preferred embodiment, the fourth position on the first arm coincides with the second position on the first arm, that is the fourth arm is connected to the first arm at the same position as the first connecting arm.

The fourth arm may be a driven arm, that is moved under the action of movement of the first and second arms. In this case, rotation of the first arm about the first fixed pivot causes the fourth arm to move. Alternatively, the fourth arm may be a driving arm, that is have a force applied thereto resulting in movement of the fourth arm, which in turn drives the other components of the assembly to result in movement of the first arm about the first fixed pivot and the second arm about the second fixed pivot.

The fourth arm may connected to an object to be moved relative to the first and second fixed pivots. The connection between the fourth arm and the object is preferably in the region of, more preferably at, the end of the fourth arm that is distal of the first and second fixed pivots. It has been found that when the fourth arm is connected to the object to be moved there is a position on the fourth arm that moves in a substantially straight line, corresponding to the movement of the said point on the third arm. The connection between the fourth arm and the object is preferably in the region of, more preferably at, this position on the fourth arm.

Taking the length of the fourth arm to be the distance between the first position on the fourth arm and the said point on the fourth arm, the length of the fourth arm will be determined by the arrangement of the first and second arms, together with the connecting arms. The length of the fourth arm is preferably less than the distance between the first and second fixed pivots. In this way, the fourth arm may be accommodated between the first and second fixed pivots, when the assembly is in the retracted position. In some embodiments, the length of the fourth arm is less than that of the first and second arms, in particular from 0.9 to 0.99 of the length of the first and/or second arms. For example, with the first and second arms being of equal length and less than the distance between the first and second fixed pivots, the third arm has a length of about 0.975 of the length of the first and second arms.

In alternative embodiments, the length of the fourth arm is the same as that of the first arm and/or the second arm. Preferably, the length of the fourth arm is the same as the length of the third arm. In one particularly preferred arrangement, the first, second, third and fourth arms are the same length.

In one embodiment, both the third arm and the fourth arm are connected to the same object to be moved, most preferably with both arms connected to the object at the said point on each of the third and fourth arm.

In alternative embodiment, each of the third and fourth arms is connected to a respective component or object to be moved. In this way, to components or objects may be moved independently of each other by the same assembly.

As noted above, the assembly may comprise additional arms. Such additional arms may be rigidly connected to one of the aforementioned arms of the assembly or may be pivotally connected to an aforementioned arm. The additional arms may be provided to provide support for one or more components or structures to be moved by the assembly. Alternatively or in addition, the additional arms may be provided to extend the distance a component or object may be moved and supported relative to the first and second fixed pivots.

As noted above, the assembly of the present invention comprises a locking assembly comprising a first locking member and a second locking member. The first locking member is connected to one of the arms of the assembly, for example one of the first, second or third arms or one of the first or second connecting arms. The first locking member may be connected to another arm of the assembly, in embodiments in which the assembly comprises arms additional to the first, second and third arms and the first and second connecting arms. The first locking member engages with the second locking member at one or more positions from the retracted position to the extended position. The assembly may comprise a single locking assembly, to lock one arm of the assembly in the desired position. Alternatively, the assembly may comprise a plurality of locking assemblies. For example, the assembly may comprise two, three, four or more locking assemblies. The plurality of locking assemblies may be arranged to lock a single arm of the assembly in the desired position. More preferably, a plurality of arms of the assembly are locked in the desired position by the locking assemblies, with each arm being locked by one or more locking assemblies.

In this respect, the term 'locking' as used herein is a reference to at least one arm having a first locking member engaged by a second locking member of a locking assembly, such that movement of the arms, and hence the assembly, beyond the required extended position in the direction of extension of the assembly is prevented. The locking assembly may operate to allow the arms and, hence the assembly, to freely move from the required extended position towards the retracted position. Alternatively, the locking assembly may act to lock the arms and the assembly in the required extended position without further movement in either the extending or the retracting directions being possible.

The or each locking assembly may be arranged to lock the arms in any extended position, as required by the duty being performed by the assembly. Preferably, the locking assembly is arranged to lock when the assembly is in the extended position in which the said point on the third arm is at the end of its path of straight line movement, described above. However, the locking assembly may be arranged to lock the assembly in another extended position, as required.

Preferably, to allow the assembly to be moved from the required extended position into the retracted position, the locking assembly is releasable. In this respect, the term 'releasable' is that the locking assembly, when engaged, acts to prevent all movement of the assembly, but may be released to allow for the first and second locking members to be disengaged from the locked position, to allow the assembly to move from the extended position towards the retracted position. The locking assembly may be unlocked manually, that is require an operator to release the first and second locking members from engagement with each other. Alternatively, the locking assembly may be arranged such that the first and second locking members are engaged by movement of the assembly from the retracted position to an extended position, so as to prevent further movement beyond the required extended position, but automatically release or freely allow movement in the reverse direction towards the retracted position.

Any suitable locking assembly having first and second locking members as hereinbefore described may be employed. In embodiments in which the assembly comprises a plurality of locking assemblies, the locking assemblies may all be of the same arrangement. Alternatively, the assembly may comprise two or more different arrangements of locking assemblies.

The or each locking assembly may be arranged to lock any of the arms of the assembly.

In one embodiment, the locking assembly is arranged to lock one of the arms of the assembly to another of the arms of the assembly in the required extended position. For example, the locking assembly may be arranged to lock adjacent arms of the assembly in the required extended position. Adjacent arms in the respect are two arms of the assembly that are pivotably connected to one another. Alternatively, the locking assembly may be arranged to couple together and lock two non-adjacent arms, that is two arms of the assembly that are not connected to one another by a pivoted connection.

Depending upon the embodiment, the assembly may have one or more pairs of arms that cross when in an extended position. As will be appreciated, once the assembly has been moved from the retracted position and is in an extended position, at least two of the arms cross to form at least one pair of crossing arms. In this respect, one arm crosses another arm when it extends on one or, depending upon the construction of the arms, on both sides of the other arm. It has been found to be particularly advantageous to lock together the arms of one or more of the pairs of crossing arms in the extended position. The arms of a pair of crossing arms are preferably locked by the locking assembly in the portions of the arms that cross one another.

In particular, the second arm crosses the first arm on one side thereof or, depending upon the construction of the arms, on both sides. In one embodiment, a locking assembly is provided between the first and second arms in the extended position. In one embodiment, a locking assembly is arranged to lock the first and second arms together, preferably in the region of the position on the arms where they cross in an extended position. More particularly, the first locking member of the locking assembly is connected to one of the first and second arms and the second locking member is connected to the other of the first and second arms.

In embodiments comprising a fourth arm, as described above, in an extended position, the fourth arm crosses the third arm on one side thereof or, depending upon the construction of the arms, on both sides. In such embodiments, a locking assembly is preferably arranged to lock the third and fourth arms together, preferably in the region of the position on the arms where they cross in an extended position. More particularly, the first locking member of the locking assembly is connected to one of the third and fourth arms and the second locking member is connected to the other of the third and fourth arms.

As noted above, locking together the arms of a pair of crossing arms in the extended position provides significantly increased strength and rigidity to the assembly. This in turn increases the load bearing capacity of the assembly in the extended position.

In this embodiment, in general, the locking assembly acts to lock or couple the two arms of a pair of crossing arms together, to prevent further extension of the assembly, as described above. Preferably, the locking assembly acts to lock or couple the arms of the crossing pair at or in the region of the position on the arms at which they cross in the extended position. In particular, the or each locking assembly comprises the first locking member connected to one arm of a pair of crossing arms and the second locking member connected to the other arm of the pair of crossing arms. Preferably, the first and/or the second locking members are connected to their respective arms in the region of the position on the arms at which they cross in the extended position.

The first and second locking members may be connected to their respective arms in any suitable arrangement, for example as required by the form of the locking assembly. In one embodiment, the first and/or second locking members are provided directly on the respective arm. Alternatively, the first and/or second locking members are provided on a connecting member extending from the respective arm.

In an alternative embodiment, the locking assembly is arranged with the first locking member connected to an arm of the assembly, as described above, and the second locking member is mounted on another component or structure. Such a component or structure may be fixed relative to the arms of the assembly, such that it does not move therewith.

For example, in one embodiment, the second locking member is mounted on the structure or component providing the first and second fixed pivots. The second locking member may be disposed in any position relative to the first and second fixed pivots. In this embodiment, the second locking member is preferably disposed between the first and second fixed pivots, more preferably between the first and second fixed pivots and lying at or close to the line joining the first and second fixed pivots. This has been found to be a particularly effective and compact arrangement for the assembly.

Alternatively, or in addition thereto, the second locking member is mounted on a structure or component that is being moved by the assembly relative to the first and second fixed pivots. The second locking member may be disposed on the component being moved at any suitable position that may be engaged by an arm of the assembly, such that it locks. This arrangement is particularly preferred in embodiments in which the assembly comprises a fourth arm, as described above, the third and fourth arms being connected to a component to be moved, in particular a component connected to the said positions on each of the third and fourth arms. The second locking member may be disposed in any position relative to the points connecting each of the third and fourth arms and the component being moved. In this embodiment, the second locking member is preferably disposed between the points connecting the third and fourth arms and the component, more preferably between the points connecting the component with the third and fourth arms and lying on the line joining the said points. In particular, it is preferred that the second locking member is between the said positions on the third and fourth arms, more preferably lying at or close to the line joining the said positions on each of the third and fourth arms. This has been found to be a particularly effective and compact arrangement for the assembly.

As noted above, the first locking member is mounted on or connected to an arm of the assembly. In embodiments in which the second locking member is provided on a structure or component other than an arm of the assembly, the arm bearing the first locking member may be extended and comprise an extension portion to which the first locking member is connected. In operation, the respective arm, including the extension portion, moves and rotates, as described above, bringing the first locking member into engagement with the second locking member in the required extended position, to thereby lock the assembly.

In a particularly preferred embodiment, at least one of the connecting arms is provided with an extension portion that bears a first locking member for engaging with a second locking member. In one embodiment, both the first and the second connecting arms comprise extension portions, each extension portion being provided with a first locking member of a respective locking assembly.

In the case of the first connecting arm, the extension portion bearing a first locking member preferably extends beyond the third arm in the direction from the first arm to the third arm, that is away from the first and second fixed pivots.

In the case of the second connecting arm, the extension portion bearing a first locking member preferably extends beyond the first arm in the direction from the second arm to the first arm, that is towards the first and second fixed pivots.

In an alternative embodiment, the locking assembly comprises a locking arm, with the first locking member being provided on a locking arm. The locking arm is pivotably connected to an arm of the assembly. In one preferred arrangement, the locking arm is pivotably connected to an arm of the assembly at a first position on the locking arm, with the first position preferably being at or near one end of the locking arm. The first locking member is preferably located on the locking arm at a second position, spaced apart from the first position on the locking arm, preferably at or near the second end of the locking arm.

More preferably, the locking assembly further comprises a support arm. The support arm is pivotably connected at a first position thereon to the locking arm at a third position on the locking arm disposed between the first and second positions thereon. The first position on the support arm is preferably at or near one end of the support arm. The support arm is further pivotably connected at a second position thereon, with the second position preferably being at or near the second end of the support arm. The support arm may be pivotably connected at its second position to a fixed structure, more preferably the structure providing the first and second fixed pivots. In one embodiment, the support arm is pivotably connected to one of the first and second fixed pivots. Alternatively, the support arm may be pivotably connected at its second position to a component being moved by the assembly, in particular a component connected to the third arm and/or, if present, the fourth arm. In one preferred embodiment, the support arm is pivotably connected at its second position to the said point on the third arm or, if present, the said point on the fourth arm.

In one preferred embodiment, the locking assembly comprises the locking arm pivotably connected at the first position thereon to the first arm, the support arm being pivotably connected to the second fixed pivot. Alternatively, or in addition, the locking assembly comprises the locking arm pivotably connected at the first position thereon to the third arm, the support arm being pivotably connected to the said point on the fourth arm of the assembly.

Examples of preferred locking assemblies will now be described.

The locking assembly comprises a first locking member and a second locking member that can be moved into engagement with one another. When the first and second locking members are engaged, they act lock the assembly in the required extended position and prevent movement of the assembly further in the extending direction. As noted above, the locking members when engaged may also prevent movement of the assembly in the reverse direction, that is towards the retracted position, thereby preventing any movement of the assembly. The locking assembly is preferably releasable, that is the first and second locking members engage in a releasable manner.

The first and second locking members may have any suitable form. In one embodiment, one of the first and second locking members is arranged to be received within the other of the first and second locking members. For example, one of the locking members may be a pin and the other locking member may comprise a receptacle for receiving the pin in the extended position. For example, the receptacle may be provided by forming the locking member with a C- U- or J-shaped portion for receiving the pin. As will be appreciated, such a locking assembly is releasable, in that it prevents movement of the assembly in the extending direction, when the pin is engaged in the receptacle, but allows the pin to leave the receptacle when the assembly is moved towards to the retracted position. A lock for holding the pin in the receptacle may be provided, if it is required to prevent movement of the assembly in the retracting direction.

Other forms of engageable locking members may also be employed. For example, one of the first or second locking members may be a moveable latch, that engages with the other of the first or second locking members.

As noted above, the first locking member is connected to an arm of the assembly and is moved by the arm into engagement with the second locking member in the required extended position. In this arrangement, the strength and rigidity of the assembly in the required extended position is increased, by virtue of the engagement of the engagement of the first and second locking members.

In one preferred embodiment, the assembly further comprises a guide assembly. The guide assembly comprises a guide member and an engagement member. The engagement member is mounted on or connected, preferably rigidly connected, to an arm of the assembly. In operation, the engagement member moveable engages with the guide member and moves relative to the guide member. When the engagement member engages with the guide member, the guide member acts to support the engagement member during its movement. In this way, the assembly is supported by the guide assembly during part or all of its movement between the retracted and required extended positions. This in turn increased the load bearing capacity, rigidity and strength of the assembly.

The engagement member is mounted on or connected to an arm of the assembly. The engagement member is preferably mounted on or connected to an arm of the assembly having a first locking member. In this way, the said arm is supported by the guide assembly during its movement into the required retracted position, before being locked therein. In a particularly preferred embodiment, the engagement member of the guide assembly is the first locking member.

The engagement member may have any suitable form to moveably engage with the guide member. For example, the engagement member may comprise a pin for slideably engaging with one or more surfaces of the guide member.

The guide member may be fixed relative to the arms of the assembly, such that it does not move therewith. For example, in one embodiment, the guide member is mounted on the structure or component providing the first and second fixed pivots. The guide member may be disposed in any position relative to the first and second fixed pivots. Alternatively, or in addition thereto, the guide member is mounted on a structure or component that is being moved by the assembly relative to the first and second fixed pivots. In a further alternative embodiment, the guide member is mounted on an arm of the assembly other than the arm bearing the engagement member.

The guide member may have any suitable form to provide support for the engagement member, and hence the arm to which it is attached, during movement of the assembly into the required extended position. In particular, the guide member preferably one or more guide surfaces on which the engagement member bears and moves.

As noted above, the assembly may comprise a guide assembly to guide and support one or more arms of the assembly during movement from the retracted position into the required extended position. This has the advantage of providing support to the assembly until it is locked into the required extended position. However, it has been found that it is advantageous to employ the assembly of WO 2013/182834 with a guide assembly as described above, with or without a locking assembly.

Accordingly, in a further aspect the present invention provides an assembly for converting motion, the assembly moveable between a retracted position and an extended position, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm;

the assembly further comprising a guide assembly comprising an engagement member and a guide member, the engagement member connected to one of the first, second or third arms or one of the first or second connecting arms and moveable engaging with the guide member during at least part of the movement of the assembly from the retracted position to the extended position.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between two of the arms and connecting arms. In one embodiment, a flexible tie or tether extends between the first arm and the third arm, in particular between a point on the first arm between the first and third positions thereon and the first position on the third arm. One preferred form for the flexible tie comprises a plurality of hingedly connected arms, components or assemblies moveable between a folded condition when the assembly is in the retracted position and a fully extended condition in the extended position. An analogous arrangement may be provided with the fourth arm, in embodiments comprising a fourth arm as described above, to limit the movement of the assembly.

In one embodiment, the limiting of the movement of the assembly is provided by one or more components being moved by the assembly between the retracted position and the extended position. In other words, the component being moved itself limits the further movement of the assembly when the component has reached its extended position and been fully deployed.

In a particularly preferred embodiment of the assembly of the present invention, the lengths of the arms are selected in accordance with the above criteria and to fold up when in the retracted position to lie between or substantially between the first and second fixed pivots. It is a particular advantage that the assembly can be arranged to be in such a compact form when in the retracted position. In a preferred embodiment, the arms are formed with portions having 'I' and 'L' shapes in cross-section, with the portions being arranged to allow the arms to be accommodated within one another when in the retracted position.

Alternatively, or in addition, one or more arms may be formed as arm assemblies, in which each arm assembly comprises a plurality of parallel arm members. The arm members may be spaced apart, with the space between adjacent arm members accommodating one or more other arms of the assembly in one or more positions from the retracted position to the extended position.

It is a further advantage of the assembly of present invention that it is highly scaleable and may be constructed and applied at a wide range of scales to convert motion, as described hereinbefore.

The assembly finds wide applications and uses, in particular by allowing relative movement between a first component and a second component.

Accordingly, in a further aspect, the present invention provides an assembly comprising a first component and a second component, the first component being arranged for movement with respect to the second component, wherein an assembly as hereinbefore described is provided between the first component and second component, operation of the assembly providing movement of the first component with respect to the second component.

One of the first and second components is connected to the third arm of the assembly and/or the fourth arm, in embodiments having a fourth arm. The other of the first and second components provides the first and second fixed pivot points to which the first and second arms are pivotally connected. In this way, movement of the first component with respect to the second component is effected. As noted above, such relative movement may be effected by applying a force to the first arm, the second arm and/or to the third arm of the assembly. The force may be applied directly to one or more arms or indirectly, from one or more drive assemblies.

The assembly comprising the first and second components finds extensive use in providing relative movement between two components. For example, the assembly finds use in moving a first component connected to either of the first or second arms and rotating about the respective first or second fixed pivot and a second component connected to the said point on the third arm and moveable in a linear motion between the retracted and extended positions. Further, the assembly finds use in displacing and rotating a first component connected to the third arm relative to the first or second fixed pivots or the line extending therebetween.

Embodiments of the assembly having a fourth arm, as described above, find particular use in moving one component relative to another component, in particular on a straight line path without rotating one component relative to the other. One component provides the first and second fixed pivots, while the other component is connected to the third and fourth arms, in particular by pivoted connections. For example, two components may be held in a fixed orientation with respect to one another and simply moved apart along a straight line.

In many applications, a plurality of assemblies is employed. In particular, a plurality of assemblies may be employed in a spaced apart relationship on opposing sides of an object to be moved. For example, a first and second assembly may be provided on opposing sides of an object to be moved with the third arms, and fourth arms if present, of two assemblies connected to opposing sides of the object.

Applications of the assembly of the present invention to convert rotational motion to linear motion include the support and movement of building structures relative to one another.

Accordingly, the present invention further provides a building comprising:

a first building portion and a second building portion, the first building portion being moveable relative to the second building portion between a retracted position and an extended position;

wherein relative movement between the first and the second building portions and support of one of the first and second building portions with respect to the other of the first and second building portions are provided by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include balconies, floor extensions, roof extensions, canopies and the like.

BRIEF DESCRIPTION OF THE SEVERAL VIEWS OF THE DRAWINGS

The principles and operation of the assembly of the present invention will be further explained by reference to the accompanying figures, in which:

FIGS. 3a to 3f are side views of an assembly according to a third embodiment of the present invention in a sequence of moves from a retracted position shown in FIG. 3a to an extended position shown in FIG. 3f;

FIGS. 4a and 4b are side views of an assembly according to a fourth embodiment of the present invention in a sequence of moves from a partially extended position shown in FIG. 4a to an extended position shown in FIG. 4b;

FIGS. 6a to 6f are side views of an assembly according to a sixth embodiment of the present invention in a sequence of moves from a retracted position shown in FIG. 6a to an extended position shown in FIG. 6f.

DETAILED DESCRIPTION OF THE INVENTION

Figure 1:
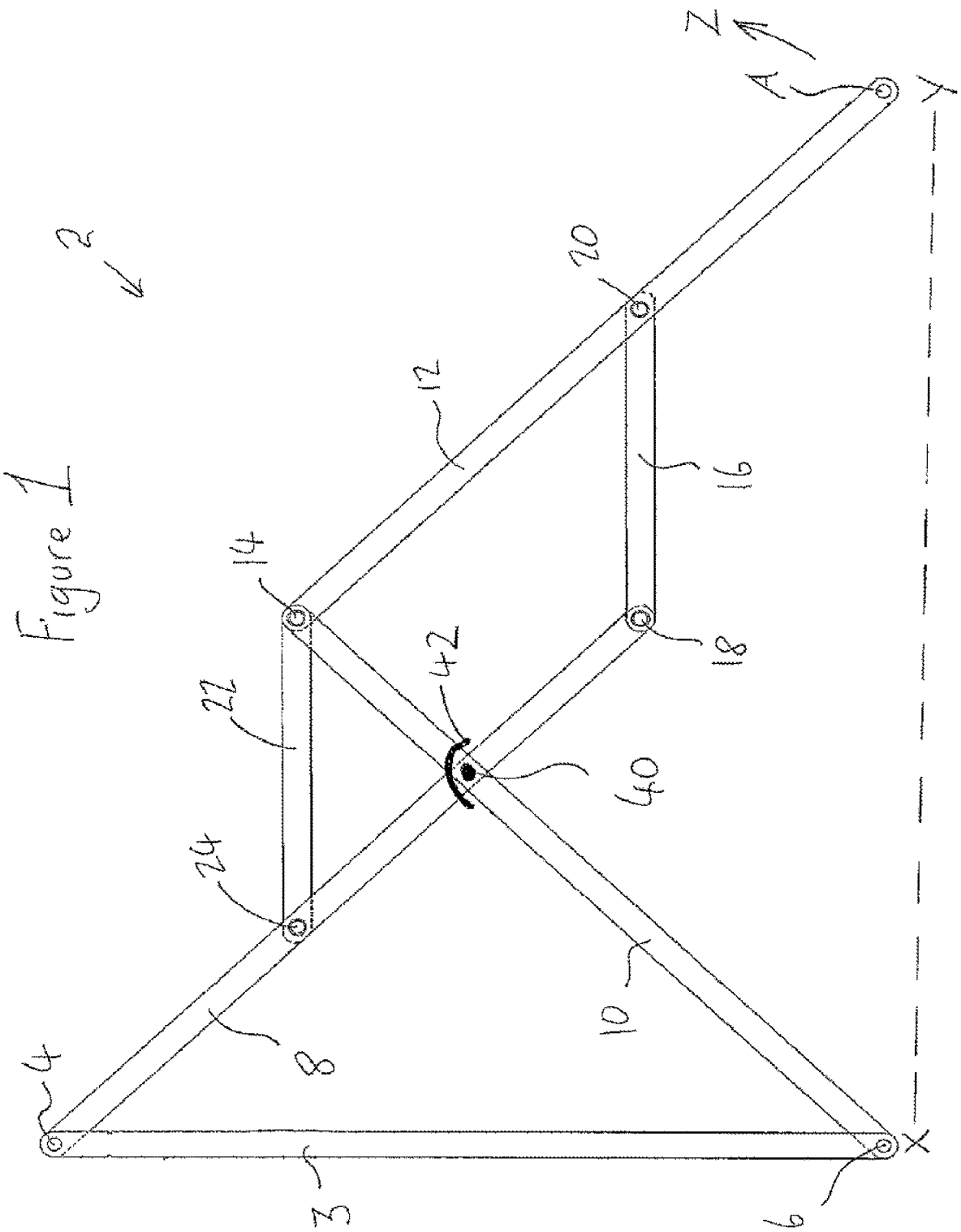
FIG. 1 is a simplified diagrammatical representation of an assembly according to one embodiment of the present invention in an extended position.

Turning to FIG. 1, there is shown a diagrammatical representation of an assembly of one embodiment of the present invention, generally indicated as 2. The assembly 2 is shown mounted to a fixed structure 3 at a first fixed pivot 4 and a second fixed pivot 6. The fixed pivots 4, 6 are spaced apart and are fixed in relation to one another.

A first arm 8 is pivotally connected at a first position at one end to the first fixed pivot 4. A second arm 10 is pivotally connected at a first position at one end to the second fixed pivot 6. A third arm 12 is mounted at a first position at one end by a pivot connection 14 at the second end of the second arm 10.

A first connecting arm 16 is mounted at one end by a pivot connection 18 at a second position on the first arm at the second end of the first arm 8. The second end of the first connecting arm is mounted by a pivot connection 20 to the third arm at a second position on the third arm 12.

A second connecting arm 22 is mounted at one end by a pivot connection 24 to the first arm at a third position on the first arm 8 spaced from both the first and second positions. The second end of the second connecting arm 22 is mounted by the pivot connection 14 to both the second arm 10 and the third arm 12.

The pivot connections may be formed by any suitable means, for example by pins extending through holes in the arms being pivotally joined.

Movement of the first arm 8 about the first fixed pivot 4 and the second arm 10 about the second fixed pivot 6 causes the third arm 12 to move such that a point A on the third arm moves between a retracted position X and an extended position Y. In moving between the positions X and Y, the point A describes a substantially straight line. Further movement of the first and second arms 8, 10 causes the point A to move beyond the extended position Y and follow an arc indicated by arrow Z.

The first arm 8 is provided with a first locking member in the form of a pin 40 extending laterally from the arm. The second arm 10 is provided with a second locking member in the form of a C-shaped receiving member 42. The pin 40 and the receiving member 42 are located respectively on the first and second arms 8, 10 where the arms cross in the extended position shown in FIG. 1.

In use, with the assembly 2 moving from a retracted position to the extended position shown in FIG. 1, that is in the direction X to Y, the first arm 8 and the second arm 10 pivot about the fixed pivots 4 and 6, respectively. As a result, the pin 40 and the receiving member 42 move through respective arcs. As the extended position shown in FIG. 1 is reached, the pin 40 engages with the receiving member 42, preventing further movement of the assembly in the direction of arrow Z, beyond the extended position shown. The engagement of the pin 40 and the receiving member 42 couples the first and second arms 8, 10, such that the assembly is triangulated, thereby increasing the strength and rigidity of the assembly.

When the assembly 2 is moved from the extended position shown in FIG. 1 to the retracted position, that is the assembly is urged towards the fixed pivots 4, 6 in the direction Y to X, the pin 40 disengages from the receiving member 42, allowing the arms of the assembly to move. A lock or latching mechanism may be provided to the coupling mechanism, in order to prevent unwanted movement of the assembly out of the extended position shown.

Movement of the assembly in the extending direction, that is in the direction X to Y, beyond the position shown in FIG. 1 is prevented by the engagement of the pin 40 in the receiving member 42, thereby locking the assembly. With the coupling mechanism omitted, the assembly may be moved beyond the extended position shown in FIG. 1, with the point A on the third arm 12 moving in the direction of the arrow Z.

Figure 2:
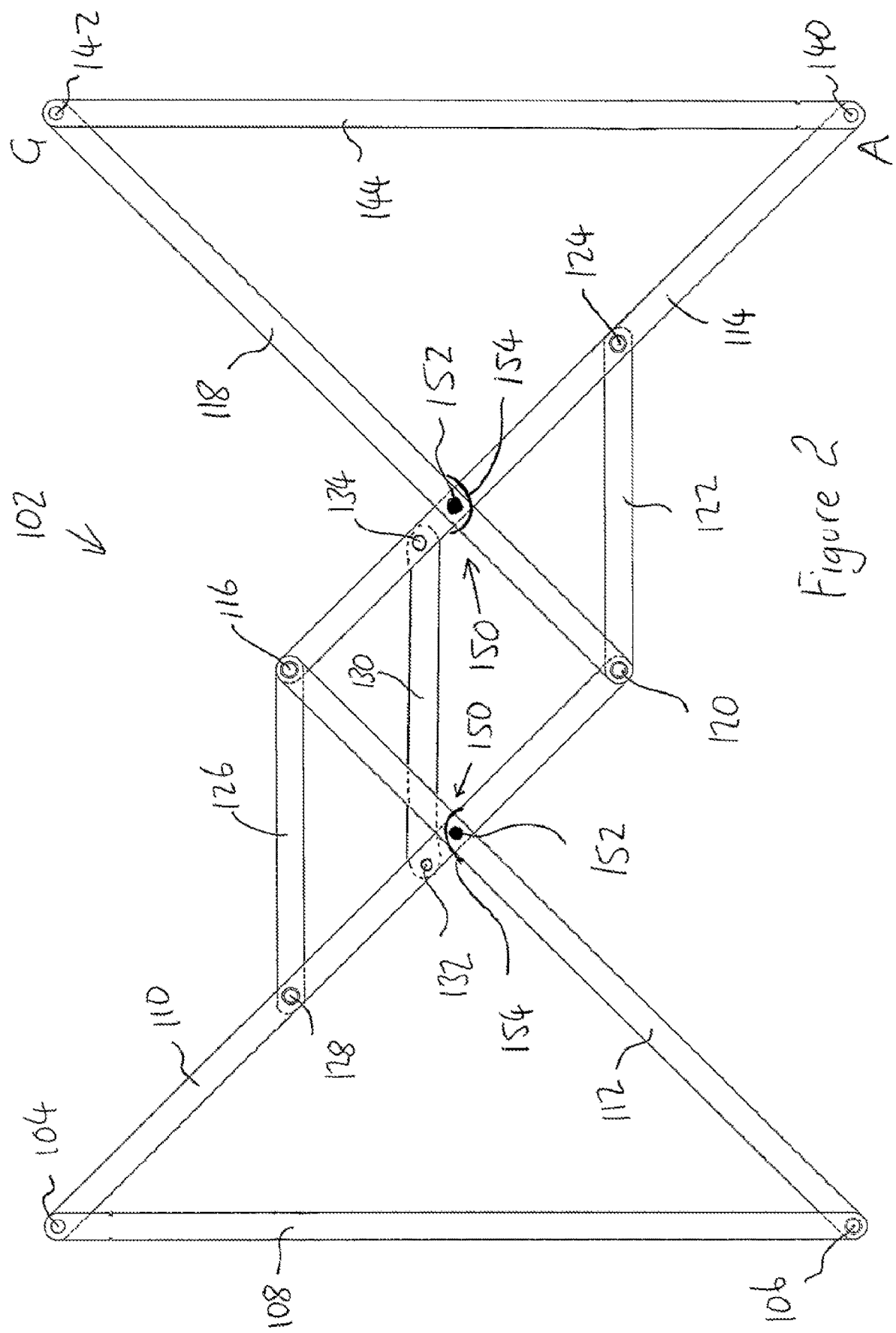
FIG. 2 is a simplified diagrammatical representation of an assembly according to a second embodiment of the present invention in an extended position.

Turning to FIG. 2, there is shown a diagrammatical representation of an assembly of one embodiment of the present invention, generally indicated as 102. The assembly 102 is shown in an extended position. The assembly 102 is shown mounted to a fixed structure at a first fixed pivot 104 and a second fixed pivot 106. The fixed pivots 104, 106 are spaced apart and are fixed in relation to one another. The fixed pivots 104, 106 are shown in FIG. 2 rigidly attached to each other by a support member 108. However, any other rigid member or component may be used to connect the fixed pivots 104, 106.

A first arm 110 is pivotally connected at a first position at one end to the first fixed pivot 104. A second arm 112 is pivotally connected at a first position at one end to the second fixed pivot 106. A third arm 114 is mounted at one end by a pivot connection 116 at the second end of the second arm 112. A fourth arm 118 is mounted at one end by a pivot connection 120 at the second end of the first arm 110.

A first connecting arm 122 is mounted at one end by the pivot connection 120 at the second end of the first arm 110. The second end of the first connecting arm 122 is mounted by a pivot connection 124 to the third arm at a second position on the third arm 114.

A second connecting arm 126 is mounted at one end by a pivot connection 128 to the first arm 110 at a third position on the first arm spaced. The second end of the second connecting arm 126 is mounted by the pivot connection 116 to both the second arm 112 and the third arm 114.

A third connecting arm 130 is connected at one end by a pivot connection 132 to the first arm at a fourth position on the first arm 110. The second end of the third connecting arm 130 is attached by a pivot connection 134 to the third arm at a third position on the third arm 114. The pivot connection 132 is located on the first arm 110 between and equidistant from the pivot connections 120 and 128 on the first arm 110. Similarly, the pivot connection 134 is located on the third arm 114 between and equidistant from the pivot connections 116 and 124 on the third arm.

The pivot connections may be formed by any suitable means, for example by pins extending through holes in the arms being pivotally joined.

In use, the third arm 114 and the fourth arm 118 are pivotably connected to an object to be moved. In particular, the third arm 114 is connected to the object by a pivot connection 140 in the distal end of the arm at a position A. Similarly, the fourth arm 118 is connected to the object by a pivot connection 142 in the distal end of the arm at a position G. The third and fourth arms may be connected to any object or component to be moved relative to the fixed pivots 104, 106. The component to be moved is shown in FIG. 2 as a support member 144, by way of example.

Movement of the first arm 110 about the first fixed pivot 104 and the second arm 112 about the second fixed pivot 106 causes the third arm 114 to move such that the point A on the third arm moves between a retracted position and an extended position. In moving between the retracted position and the extended position, the point A on the third arm 114 describes a substantially straight line. Similarly, movement of the first arm 110 about the first fixed pivot 104 and the second arm 112 about the second fixed pivot 106 causes the fourth arm 118 to move such that the point G on the fourth arm moves between a retracted position and an extended position. In moving between the retracted position and the extended position, the point G on the fourth arm 118 describes a substantially straight line.

The support member 144 is moved in a substantially straight line relative to the fixed pivots 104, 106. The support member 144 is held parallel to the line joining the fixed pivots 104, 106 and the support member 108 throughout its motion, in the arrangement shown in FIG. 2.

As can be seen in FIG. 2, in the extended position shown, the first arm 110 and second arms 112 cross one another. Similarly, the third arm 114 and the fourth arm 118 cross one another. Each pair of crossing arms is provided with a locking assembly 150, comprising a pin 152 and a J-shaped receiving member 154, in a similar manner to that described above and shown in FIG. 1. In the extended position shown in FIG. 2, the pin is engaged with the J-shaped receiving member. In this way, the assembly 102 is triangulated when in the extended position shown.

While it is preferred that both pairs of crossing arms are provided with a coupling mechanism 150, as shown, a single locking assembly provided for the first and second arms 110, 112 or the third and fourth arms 114, 118 is sufficient to lock the assembly in the extended position.

Figure 3A:
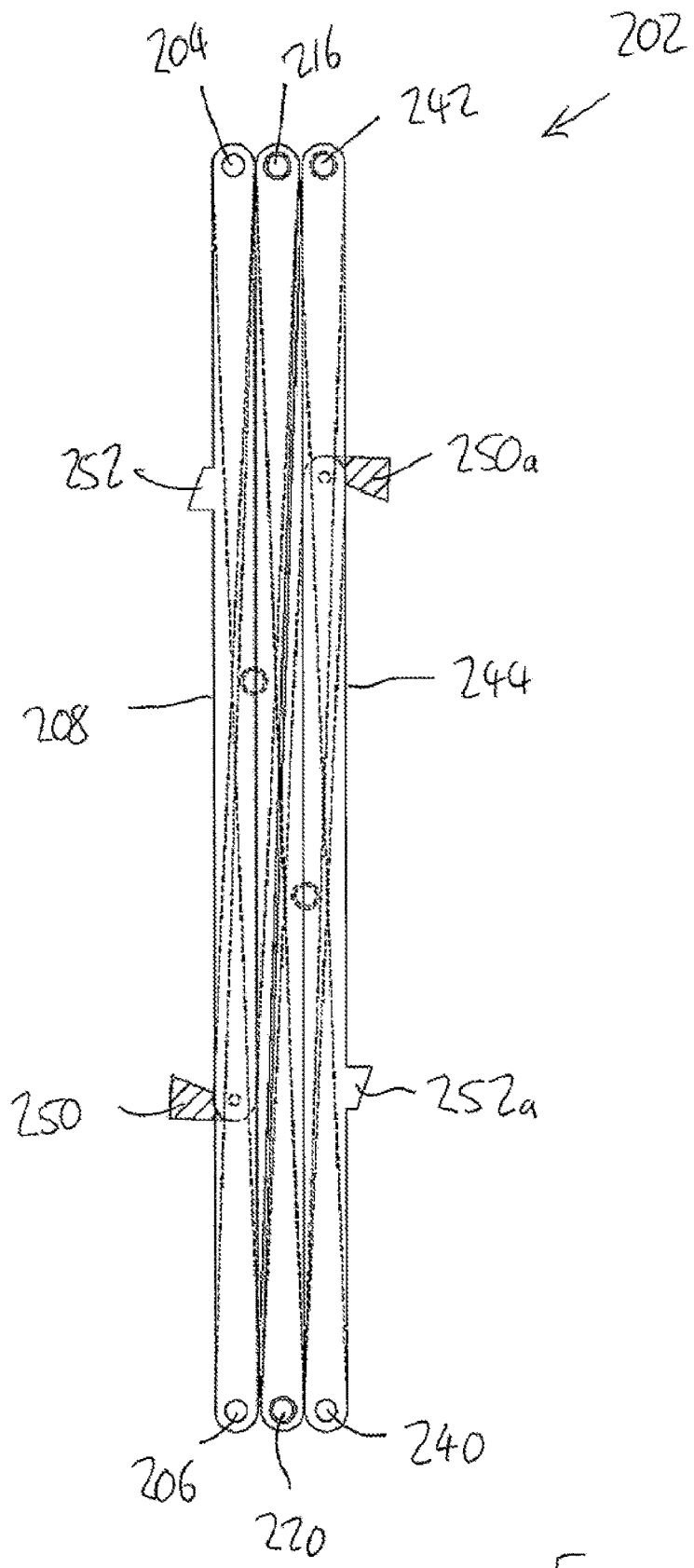
Figure 3B:
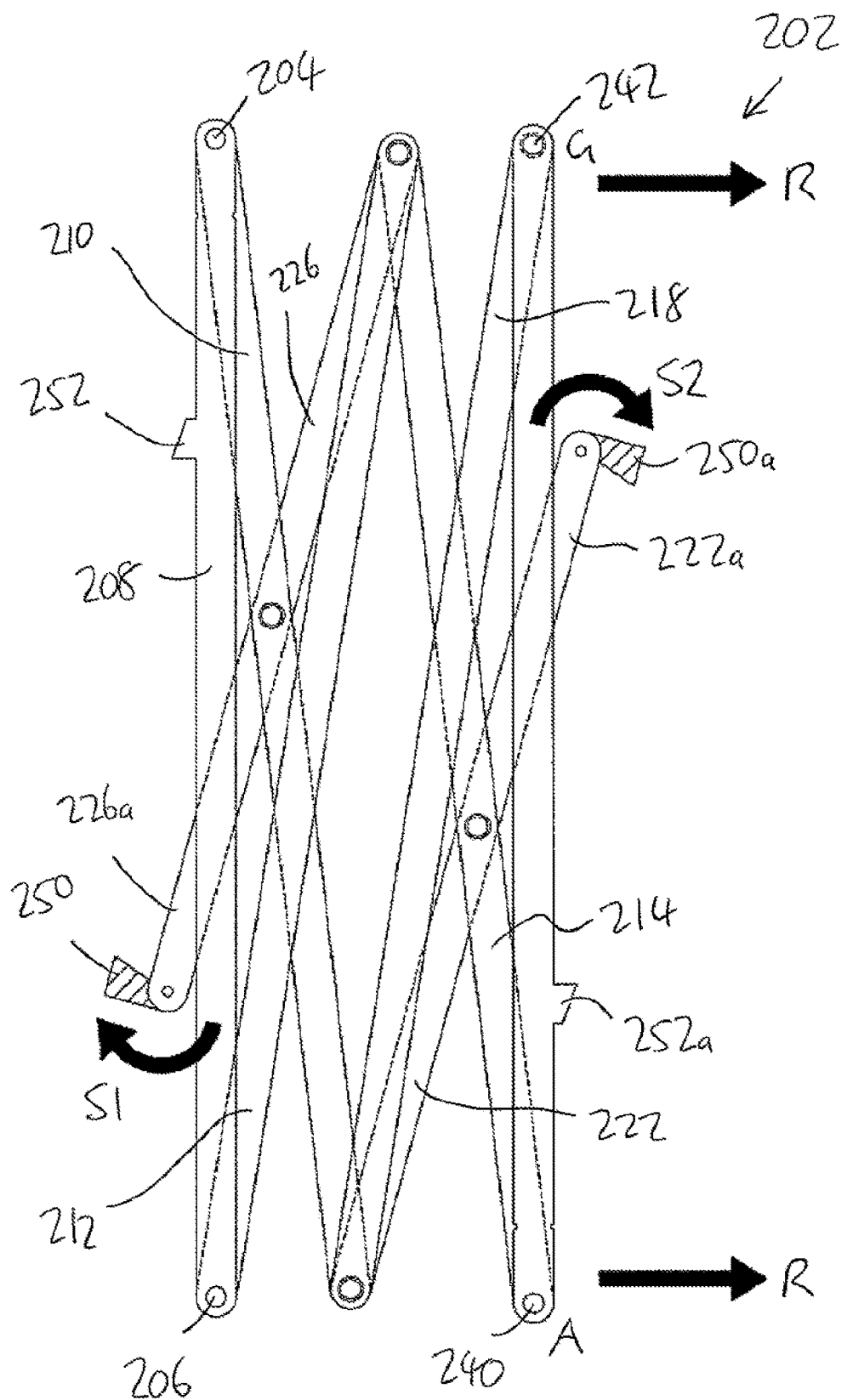
Figure 3C:
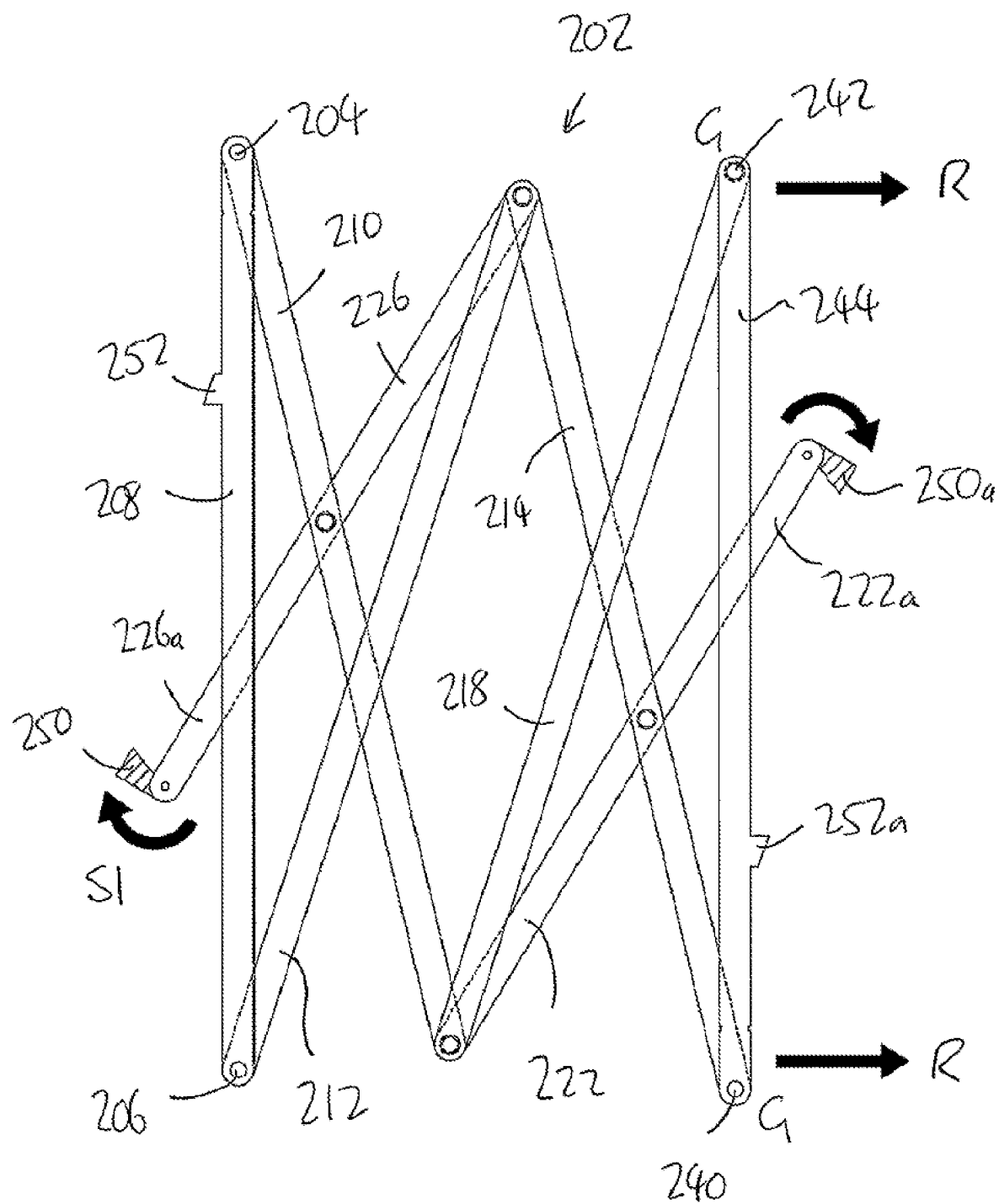

Turning to FIGS. 3a to 3f, there is shown an assembly according to a further embodiment of the present invention in a sequence of moves from a retracted position in FIG. 3a to an extended position in FIG. 3f.

The assembly, generally indicated as 202, is shown mounted to a fixed structure at a first fixed pivot 204 and a second fixed pivot 206. The fixed pivots 204, 206 are spaced apart and are fixed in relation to one another. The fixed pivots 204, 206 are shown in FIGS. 3a to 3f rigidly attached to each other by a support member 208. However, any other rigid member, fixed structure or component may be used to connect the fixed pivots 204, 206 or have them mounted thereon.

A first arm 210 is pivotally connected at a first position at one end to the first fixed pivot 204. A second arm 212 is pivotally connected at a first position at one end to the second fixed pivot 206. A third arm 214 is mounted at one end by a pivot connection 216 at the second end of the second arm 212. A fourth arm 218 is mounted at one end by a pivot connection 220 at the second end of the first arm 210.

A first connecting arm 222 is mounted at one end by the pivot connection 220 at the second end of the first arm 210. The second end of the first connecting arm 222 is mounted by a pivot connection 224 to the third arm at a second position on the third arm 214.

A second connecting arm 226 is mounted at one end by a pivot connection 228 to the first arm 210 at a third position on the first arm spaced. The second end of the second connecting arm 226 is mounted by the pivot connection 216 to both the second arm 212 and the third arm 214.

The assembly 202 of FIGS. 3a to 3f may comprise a third connecting arm in analogous manner to that shown in FIG. 2.

The pivot connections may be formed by any suitable means, for example by pins extending through holes in the arms being pivotally joined.

In use, the third arm 214 and the fourth arm 218 are pivotably connected to an object to be moved. In particular, the third arm 214 is connected to the object by a pivot connection 240 in the distal end of the arm at a position A. Similarly, the fourth arm 218 is connected to the object by a pivot connection 242 in the distal end of the arm at a position G. The third and fourth arms may be connected to any object or component to be moved relative to the fixed pivots 204, 206. The component to be moved is shown in FIGS. 3a to 3f as a support member 244, by way of example.

Movement of the first arm 210 about the first fixed pivot 204 and the second arm 212 about the second fixed pivot 206 causes the third arm 214 to move such that the point A on the third arm moves between a retracted position shown in FIG. 3a and an extended position, shown in FIG. 3f. In moving between the retracted position and the extended position, the point A on the third arm 214 describes a substantially straight line. Similarly, movement of the first arm 210 about the first fixed pivot 204 and the second arm 212 about the second fixed pivot 206 causes the fourth arm 218 to move such that the point G on the fourth arm moves between a retracted position and an extended position. In moving between the retracted position and the extended position, the point G on the fourth arm 218 describes a substantially straight line.

The support member 244 is moved in a substantially straight line relative to the fixed pivots 204, 206, as indicated by the arrows R in the figures. The support member 244 is held parallel to the line joining the fixed pivots 204, 206 and the support member 208 throughout its motion.

The assembly 202 of FIGS. 3a to 3f is provided with a plurality of locking assemblies, as follows:

The second connecting arm 226 is provided with an extended arm portion 226a, extending beyond the first arm 210 in the direction of the member 208. The extended arm portion 226a is provided with a first locking member 250 on its free end.

A second locking member 252 is provided on the support member 208. In operation, the first locking member 250 is caused to move upwards from the retracted position of FIG. 3a in a curved path, indicated by the arrow S1, to engage with the second locking member 252, when the assembly is in the extended position shown in FIG. 3f.

Similarly, the first connecting arm 222 is provided with an extended arm portion 222a, extending beyond the third arm 214 in the direction of the moveable support member 244.

The extended arm portion 222a is provided with a first locking member 250a on its free end.

A second locking member 252a is provided on the support member 244. In operation, the first locking member 250a is caused to move downwards from the retracted position of FIG. 3a in a curved path, indicated by the arrow S2, to engage with the second locking member 252a, when the assembly is in the extended position shown in FIG. 3f.

Engagement of the first locking members 250, 250a with the respective second locking members 252, 252a locks the assembly in the extended position shown in FIG. 3f.

Figure 4A:
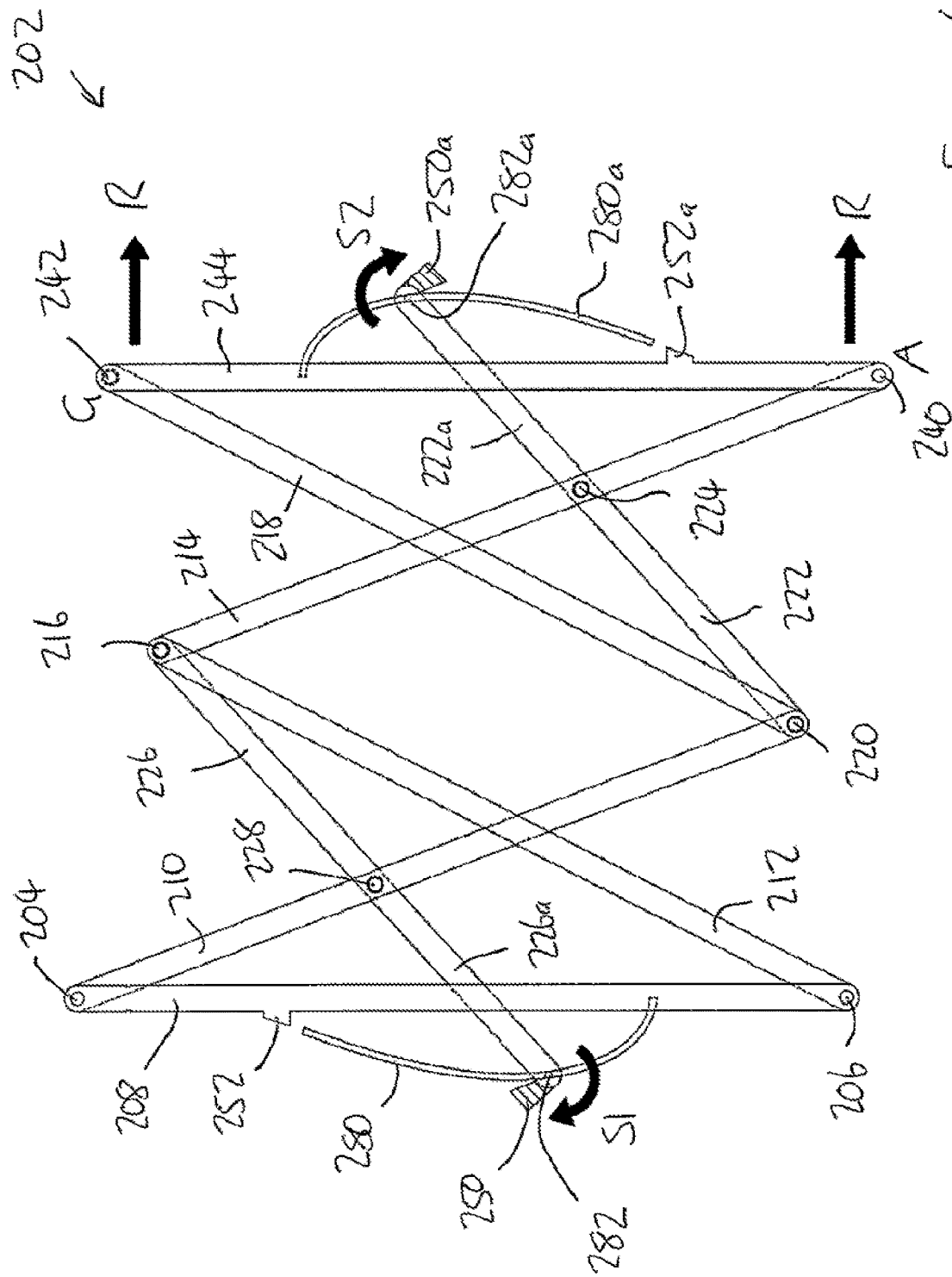

Turning to FIGS. 4a and 4b, there is shown an assembly having the same general configuration as the assembly of FIGS. 3a to 3f. Accordingly, the components of the assembly of FIGS. 4a and 4b are indicated using the same reference numerals as in FIGS. 3a to 3f and described above. Operation of the assembly of FIGS. 4a and 4b is directly analogous to that shown in FIGS. 3a to 3f and described above.

The assembly of FIGS. 4a and 4b comprises guide members for each locking assembly, as follows:

An arcuate guide member 280 is provided on the support member 208. A pin 282 is provided at the free end of the extended arm portion 226a of the second connecting arm 226 and engages with the guide member 280. In this way, the extended arm portion 226a is supported and guided by the guide member as the first locking member 250 moves into and out of engagement with the second locking member 252, during movement of the assembly between its retracted position and its extended position shown in FIG. 4b.

Similarly, an arcuate guide member 280a is provided on the support member 244. A pin 282a is provided at the free end of the extended arm portion 222a of the first connecting arm 222 and engages with the guide member 280a. In this way, the extended arm portion 222a is supported and guided by the guide member as the first locking member 250a moves into and out of engagement with the second locking member 252a, during movement of the assembly between its retracted position and its extended position shown in FIG. 4b.

The principle of providing guide members to guide and support the first locking members may also be applied to the embodiment of FIG. 1, in which the locking members are disposed directly on the arms of the assembly. An example of such an arrangement is shown in FIG. 5.

Figure 5:
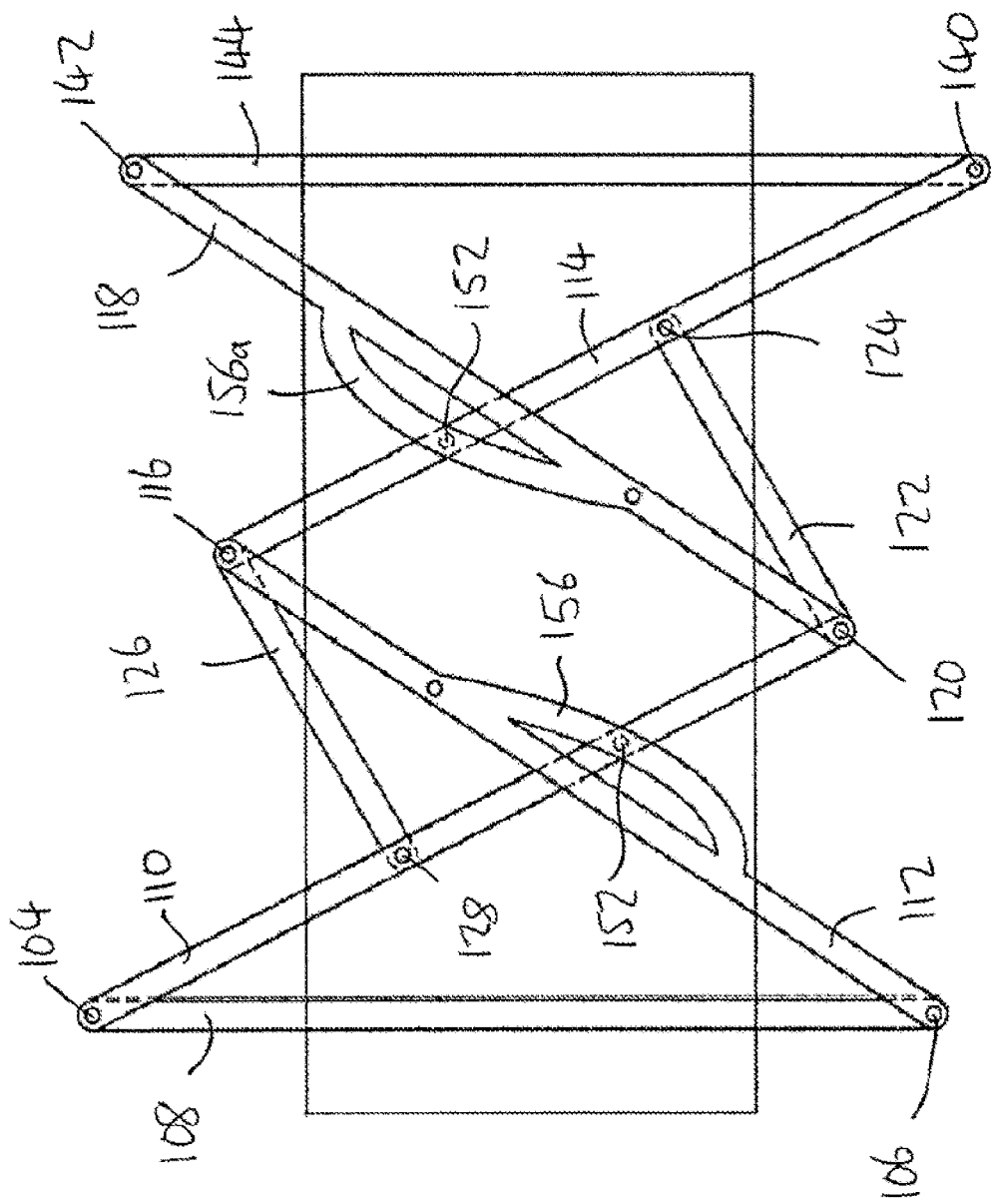
FIG. 5 is a side view of an assembly according to a fifth embodiment of the present invention in a partially extended position.

Turning to FIG. 5, an assembly analogous to the assembly of FIG. 2, without a third connecting arm, is shown. The components of the assembly of FIG. 5 are indicated by the same reference numerals as used in FIG. 2 and as discussed above.

As with the embodiment of FIG. 5, a first pair of crossing arms, formed by the first and second arms 110, 112, and a second pair of crossing arms, formed by the third and fourth arms 114, 118, are both provided with locking assemblies having first and second locking members mounted on respective arms of each pair, as in FIG. 2.

Figure 5A:
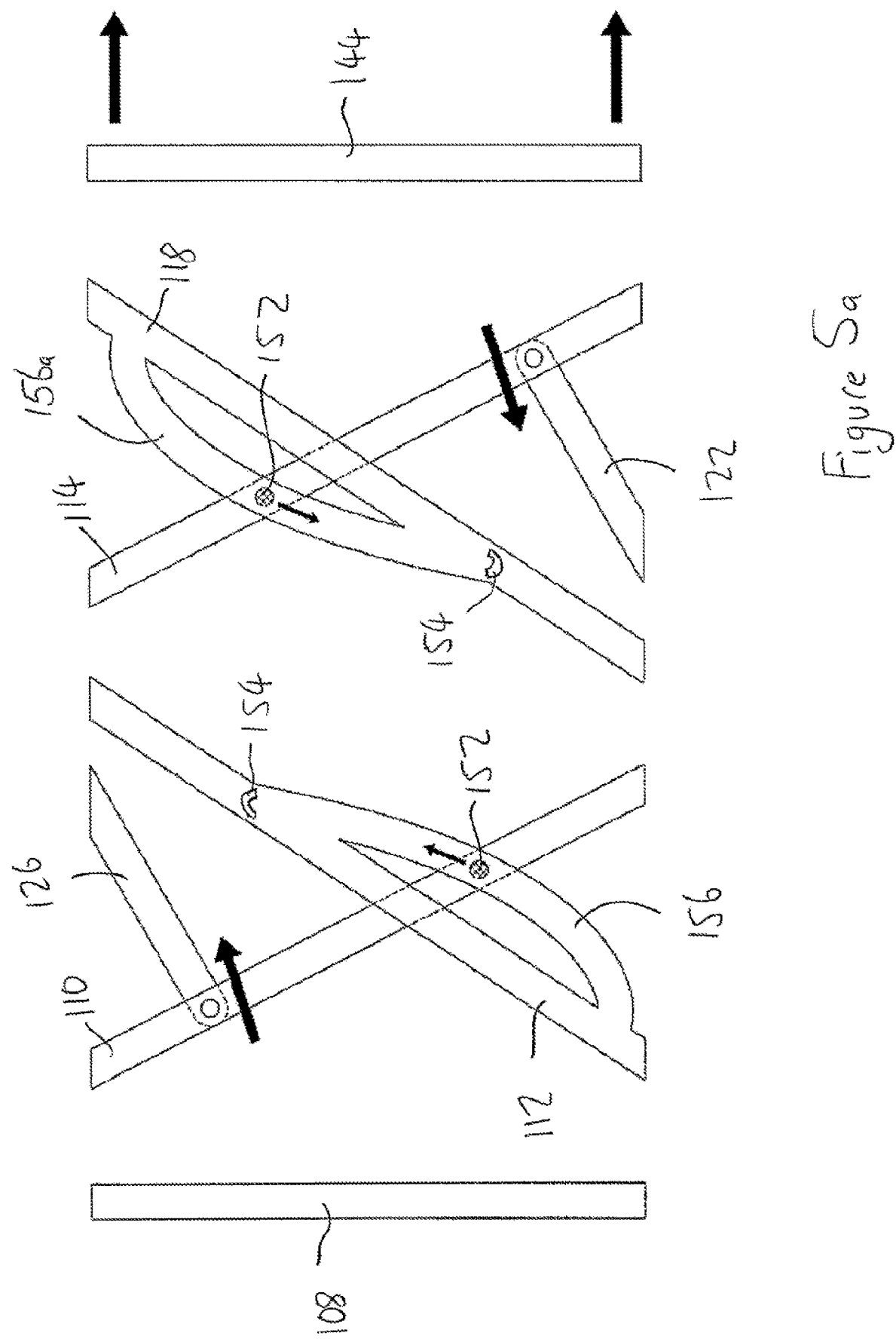
FIG. 5a is a detail of a central portion of the assembly of FIG. 5 showing the locking assemblies.

As shown in FIG. 5, the second arm 112 is provided with an arcuate guide member 156. The guide member 156 is engaged by the first locking member on the first arm and acts to guide and support the first locking member, and hence the first arm 110 during the movement of the first locking member into and out of engagement with the second locking member disposed in the second arm 112. Similarly, the fourth arm 118 is provided with an arcuate guide member 150a. The guide member 150a is engaged by the first locking member 152 on the third arm and acts to guide and support the first locking member, and hence the third arm 114 during the movement of the first locking member into and out of engagement with the second locking member disposed in the fourth arm 118. This arrangement is shown in detail in FIG. 5a. The arrows in FIG. 5a show the direction of movement of the components of the assembly when moving in the extending direction to the extended position in which the locking assemblies are engaged and locked.

Turning to FIGS. 6a to 6f, there is shown an assembly having the same general configuration as the assembly of FIGS. 3a to 3f. Accordingly, the components of the assembly of FIGS. 6a to 6f are indicated using the same reference numerals as in FIGS. 3a to 3f and described above. Operation of the assembly of FIGS. 6a to 6f is directly analogous to that shown in FIGS. 3a to 3f and described above.

In the assembly of FIGS. 6a to 6f, the first locking members 250, 250a are in the form of slots formed in the end of the respective extended arm portions 222a, 226a and the second locking members 252, 252a are in the form of pins extending from the respective support members 208, 244. In the locking position, the slots in the end portions of the arms engage with the pins.

The assembly of FIGS. 6a to 6f comprises additional locking assemblies, as follows:

A locking arm 290 is pivotably mounted at one end by the pivot connection 220 at the second end of the first arm 210. The other end of the locking arm 290 is provided with a first locking member in the form of a slot 292 formed in the arm. A support arm 294 is pivotably connected at one end to the second fixed pivot 206. The second end of the support arm 294 is pivotably connected to the locking arm 290 at a pivot connection 296 disposed between the pivot connection 220 and the locking member 292.

Figure 6B:
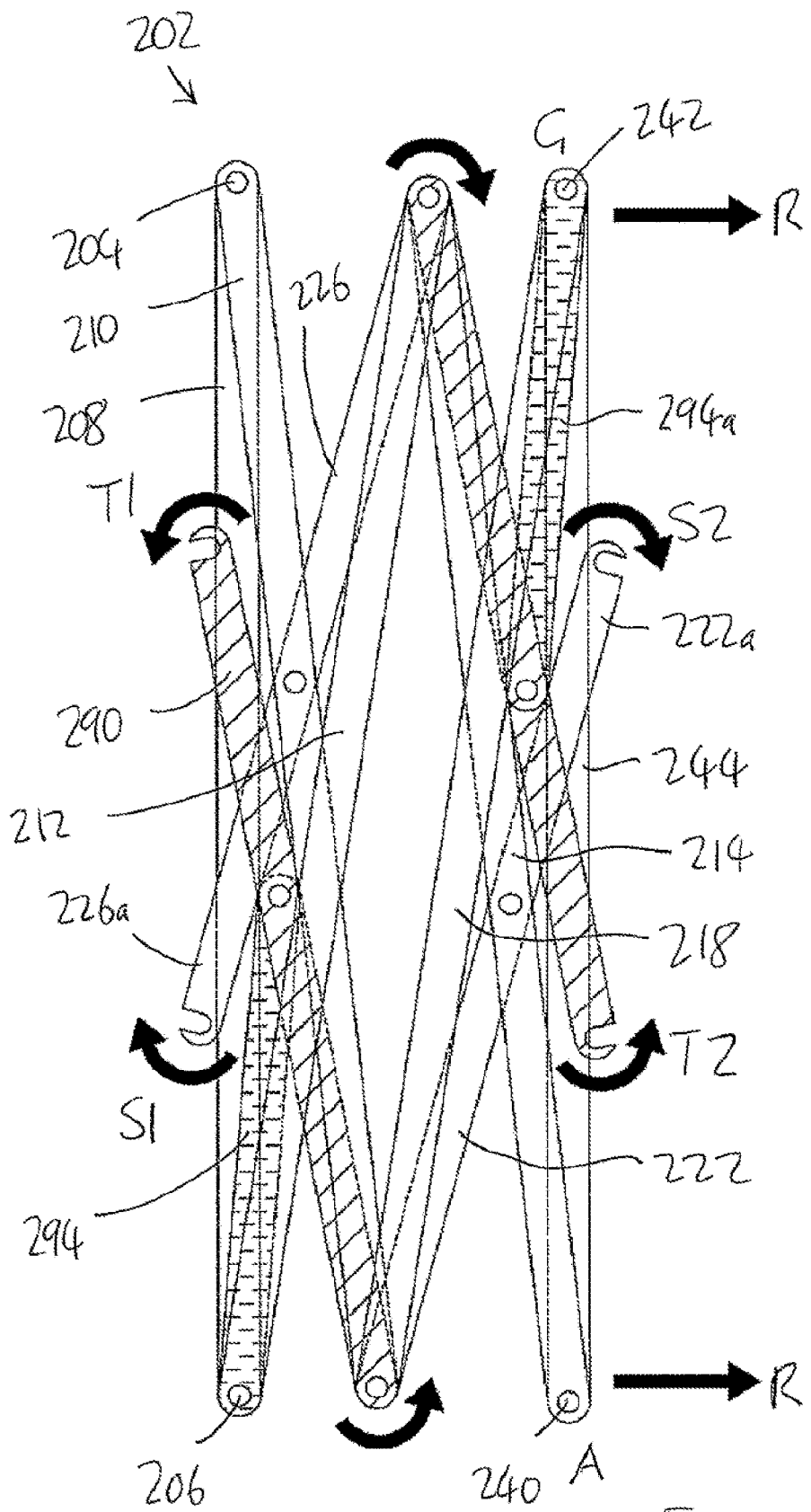
Figure 6C:
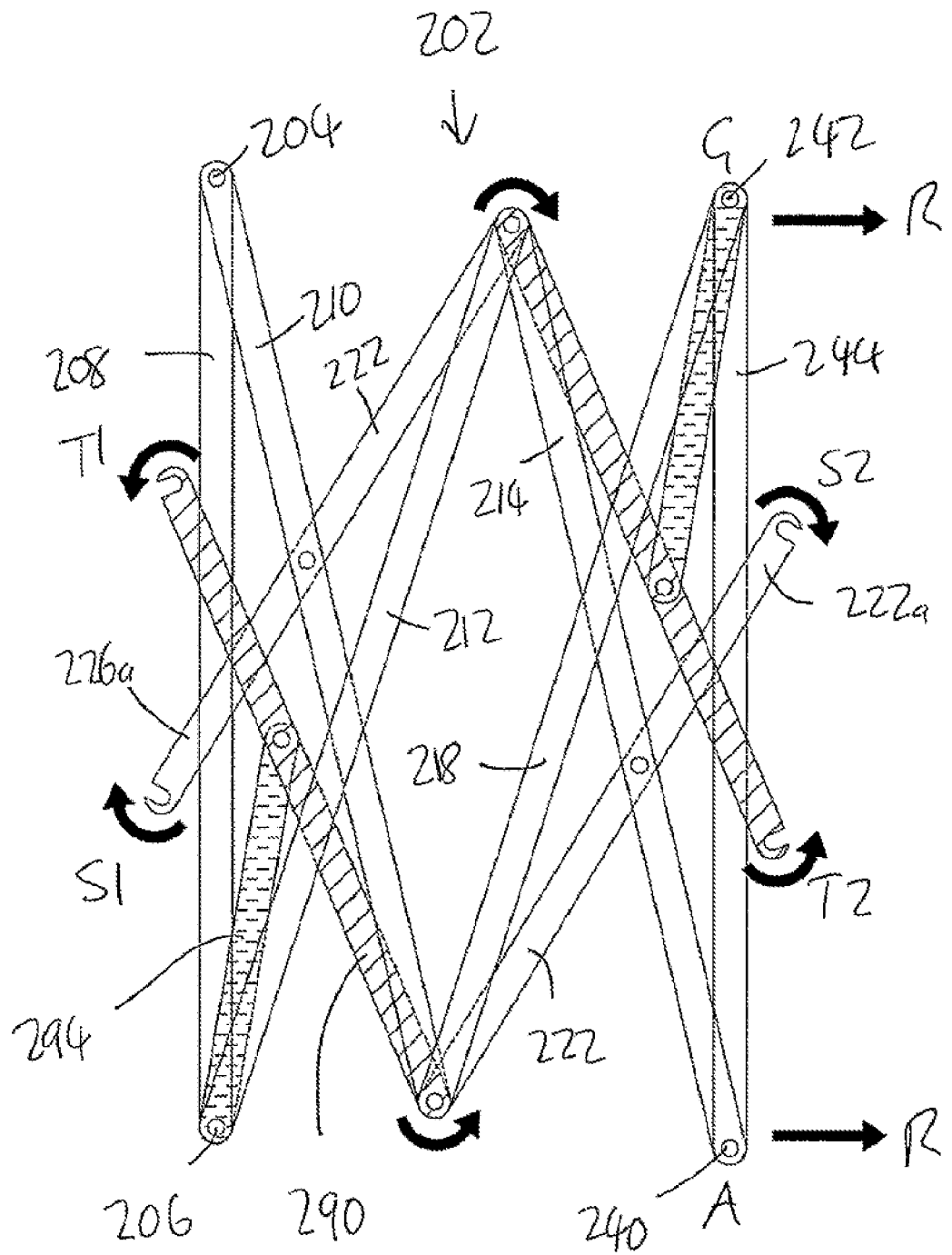
Figure 6D:
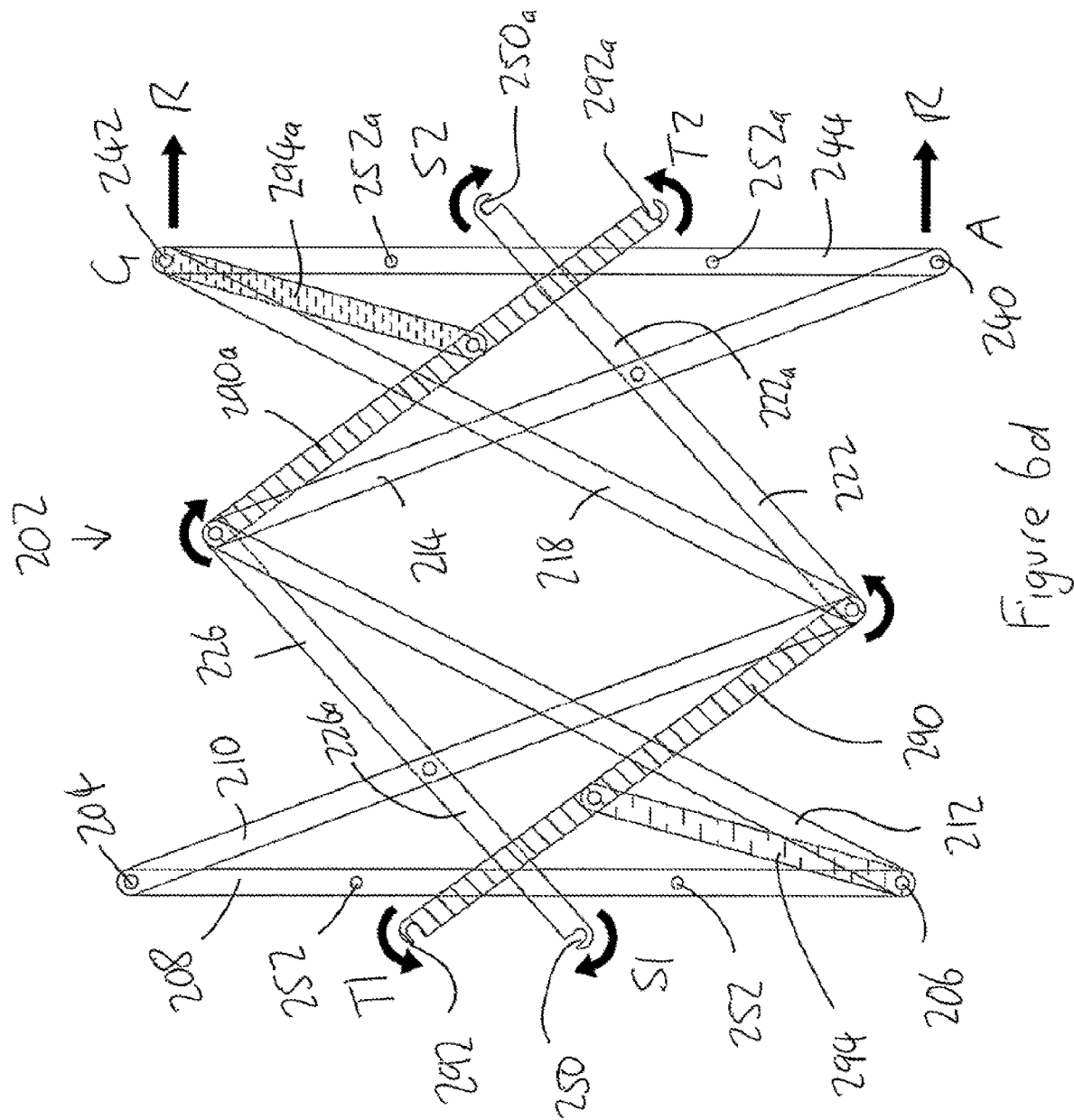
Figure 6E:
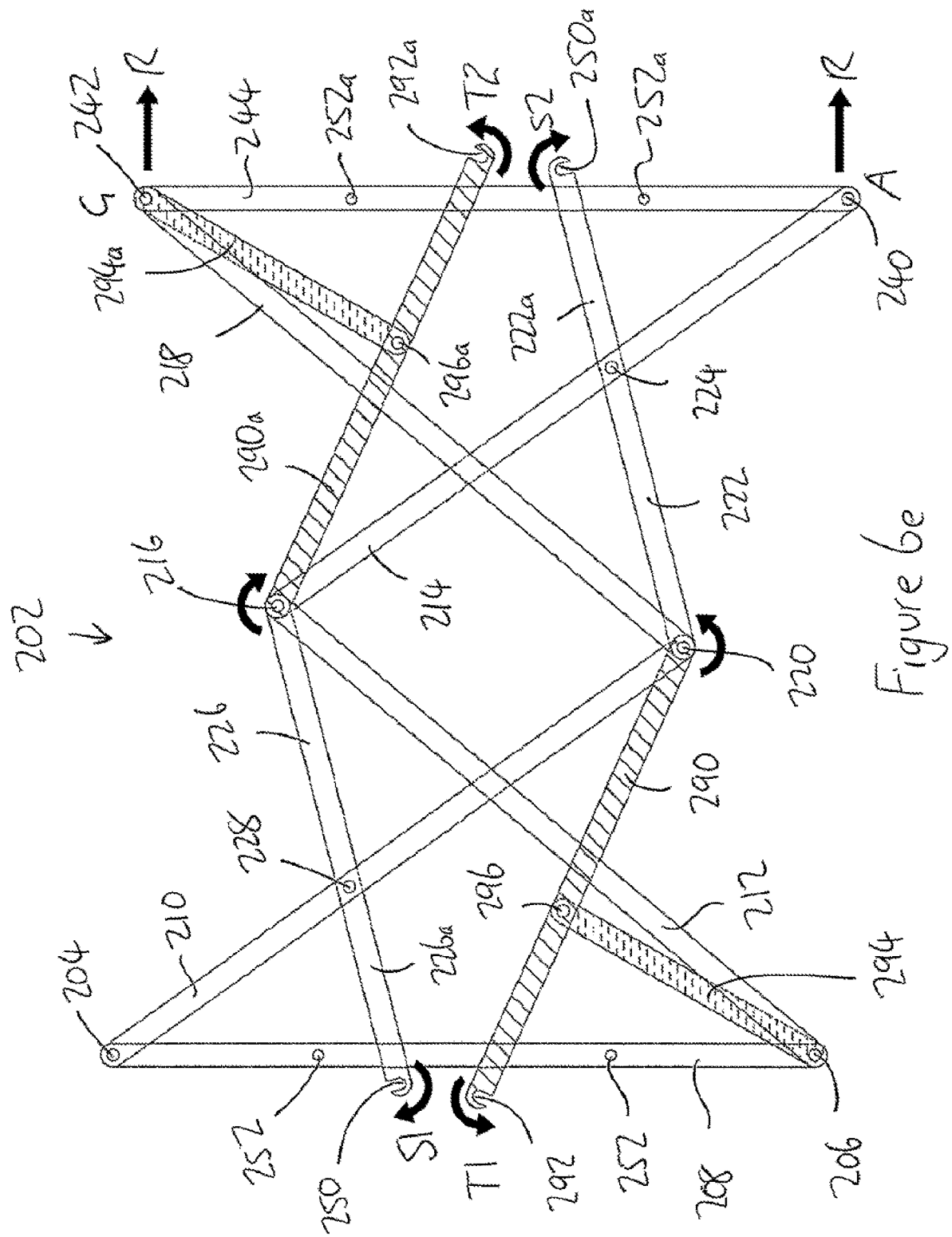
Figure 6F:
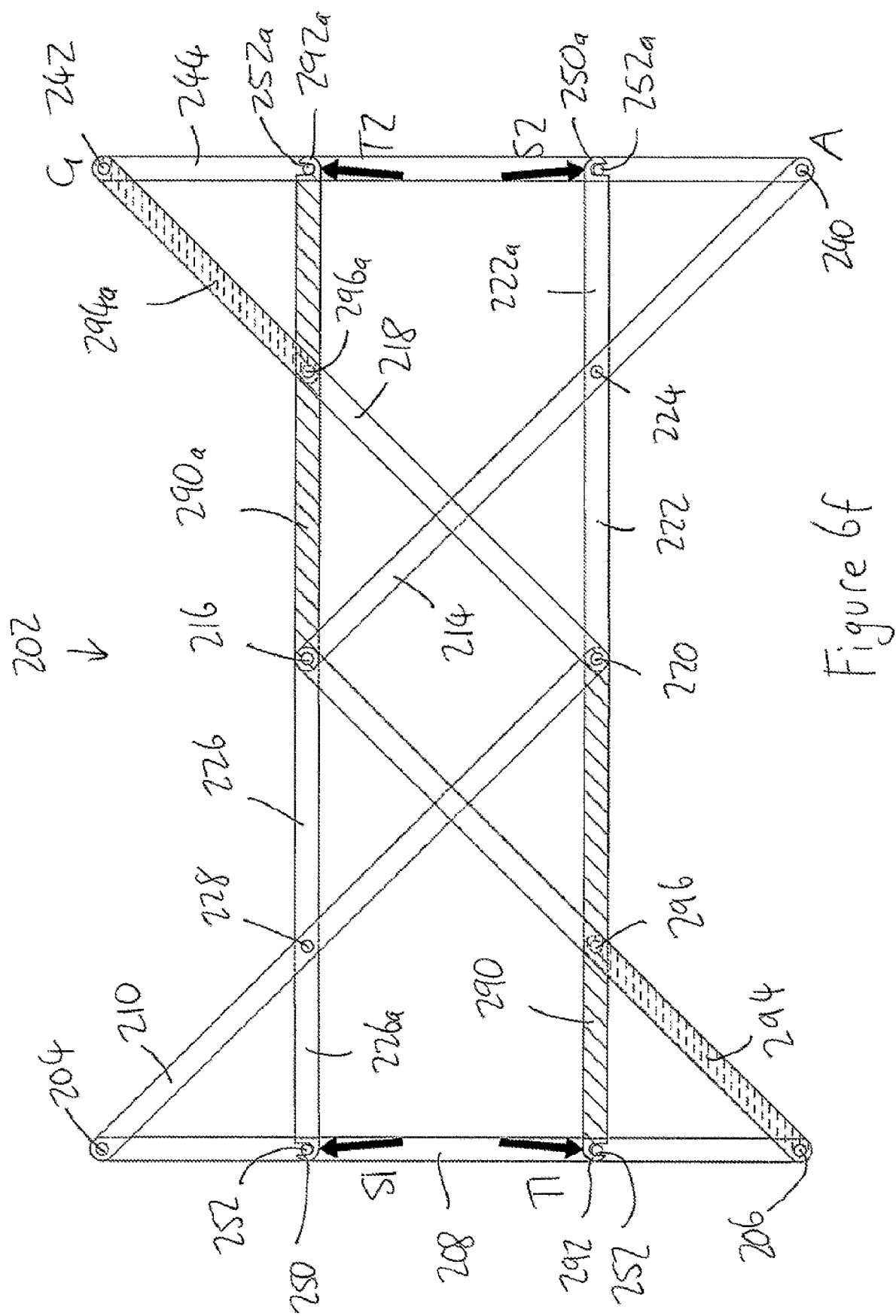

In operation, the first locking member 292 on the locking arm 290 is caused to move downwards from the retracted position of FIG. 5a in a curved path, indicated by the arrow T1, to engage with a further second locking member 252, in the form of a pin on the support member 208, when the assembly is in the extended position shown in FIG. 6f.

Similarly, a locking arm 290a is pivotably mounted at one end by the pivot connection 216 at the second end of the second arm 212. The other end of the locking arm 290a is provided with a first locking member in the form of a slot 292a formed in the arm. A support arm 294a is pivotably connected at one end to the pivot 242 on the moveable support member 244. The second end of the support arm 294a is pivotably connected to the locking arm 290a at a pivot connection 296a disposed between the pivot connection 216 and the locking member 292a.

In operation, the first locking member 292a on the locking arm 290a is caused to move upwards from the retracted position of FIG. 6a in a curved path, indicated by the arrow T2, to engage with a further second locking member 252a, in the form of a pin on the support member 244, when the assembly is in the extended position shown in FIG. 6f.

The assembly of FIGS. 6a to 6f is shown comprising both the extended arm portions 226a, 222a and the locking arms 290, 290a, to provide multiple locks for the assembly in the extended position. It is to be understood that locking the assembly may be achieved using just one locking assembly. For example, the extended arm portions 226a, 222a and their respective locking members may be omitted.

The assemblies shown in FIGS. 1 to 6 may be used singularly, as shown in the figures. Alternatively, the assemblies may be combined and connected together, whereby a first assembly supports and moves a second assembly, which may in turn support and move a third assembly. In particular, the moveable support member 144, 244 of one assembly may form the fixed member 3, 108, 208 of a connected assembly.

The assemblies shown in FIGS. 1 to 6 may consist of the components shown in the figures and described above. Alternatively, one or more of the arms may be extended and/or additional arms may be provided, to support and move one or more components, as required. This principle is exemplified in FIG. 7.

Figure 7:
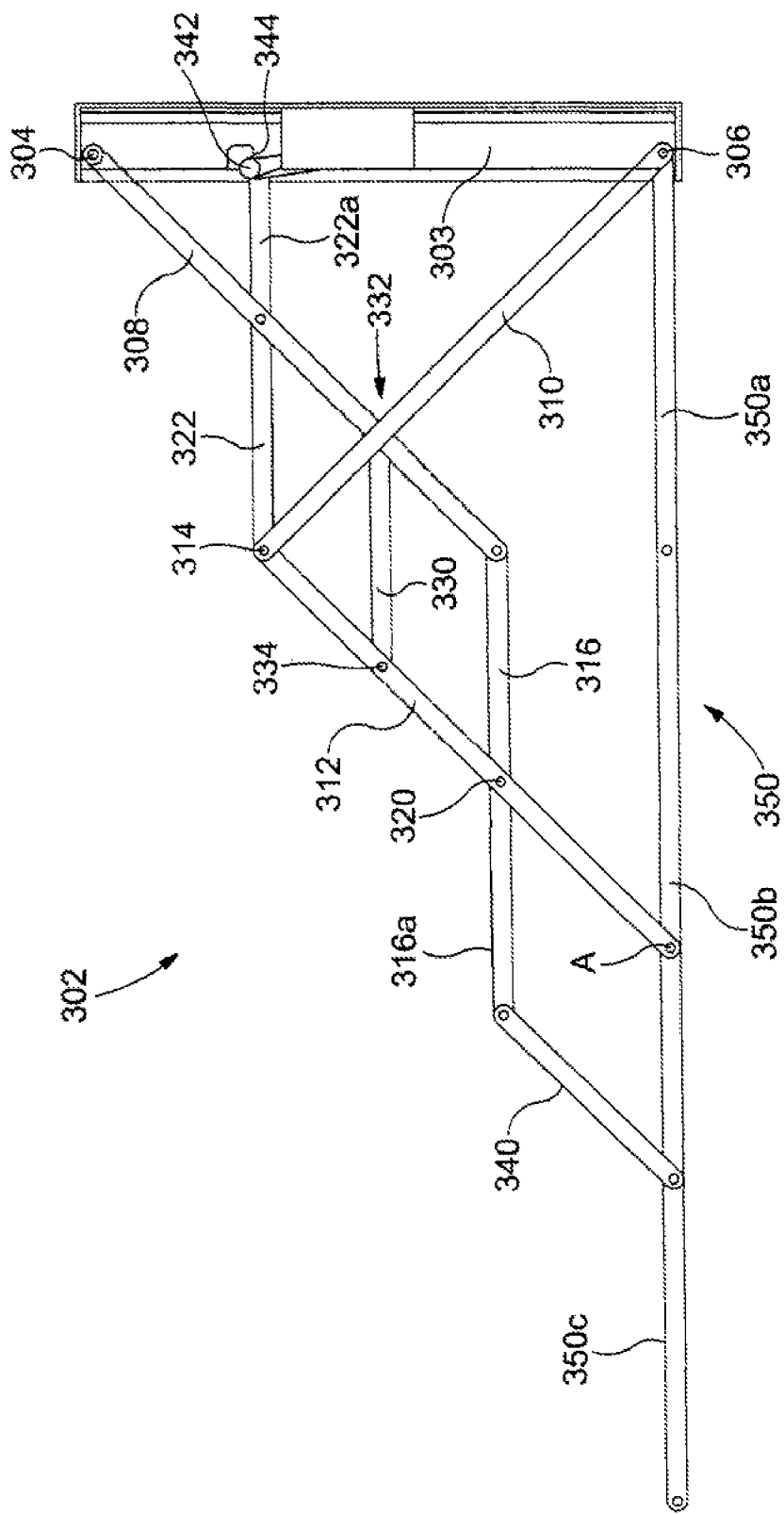
FIG. 7 is a side view of an assembly according to a seventh embodiment of the present invention in an extended position.

Turning to FIG. 7, there is shown a further embodiment of an assembly according to the present invention. The assembly, generally indicated as 302, is shown mounted to a fixed structure 303 at a first fixed pivot 304 and a second fixed pivot 306. The fixed pivots 304, 306 are spaced apart and are fixed in relation to one another.

A first arm 308 is pivotally connected at a first position at one end to the first fixed pivot 304. A second arm 310 is pivotally connected at a first position at one end to the second fixed pivot 306. A third arm 312 is mounted at a first position at one end by a pivot connection 314 at the second end of the second arm 310.

A first connecting arm 316 is mounted at one end by a pivot connection 318 at a second position on the first arm at the second end of the first arm 308. The second end of the first connecting arm is mounted by a pivot connection 320 to the third arm at a second position on the third arm 312.

A second connecting arm 322 is mounted at one end by a pivot connection 324 to the first arm at a third position on the first arm 308 spaced from both the first and second positions. The second end of the second connecting arm 322 is mounted by the pivot connection 314 to both the second arm 310 and the third arm 312.

A third connecting arm 330 is connected at one end by a pivot connection 332 to the first arm at a fourth position on the first arm 308. The second end of the third connecting arm 330 is attached by a pivot connection 334 to the third arm 312 at a third position on the third arm. The pivot connection 332 is located on the first arm 308 between and equidistant from the pivot connections 318 and 324 on the first arm 308. Similarly, the pivot connection 334 is located on the third arm 312 between and equidistant from the pivot connections 314 and 320 on the third arm.

The pivot connections may be formed by any suitable means, for example by pins extending through holes in the arms being pivotally joined.

The first connecting arm 316 comprises an extended portion 316a, extending beyond the third arm 312 away from the fixed structure 303. A support arm 340 is pivotally connected at one end to the free end of the extended portion 316a.

The second connecting arm 322 is provided with an extended arm portion 322a, extending beyond the first arm 208 in the direction of the structure 303. The extended arm portion 322a is provided with a first locking member 342 on its free end.

A second locking member 344 is provided on the structure 303. In operation, the first locking member 342 is caused to move upwards from its retracted position in a curved path, in a manner analogous to that shown in FIGS. 3a to 3f, to engage with the second locking member 344, when the assembly is in the extended position shown in FIG. 7.

A structure 350 to be moved by the assembly 302 is shown in FIG. 7 pivotably connected to the second fixed pivot 306, the point A on the third arm 312 and the second end of the support arm 340. The structure 350 comprises hingedly attached components 350a, 350b and 350c, which extend horizontally in the extended position shown in FIG. 7.

The structure 350 may be any structure that requires deploying from a fixed structure, for example a walkway, a deck or a bridge.

The invention claimed is:

1. An assembly for converting motion, the assembly moveable between a retracted position and an extended position, the assembly comprising:
    a first arm rotatable at a first position thereon about a first fixed pivot;
    a second arm rotatable at a first position thereon about a second fixed pivot, the second fixed pivot spaced apart from the first fixed pivot;
    a third arm pivotably connected at a first position thereon to the second arm at a second position on the second arm, the second position spaced apart from the first position on the second arm;
    a first connecting arm extending between the first arm and the third arm, the first connecting arm pivotably connected to a second position on the first arm spaced apart from the first position and pivotably connected to the third arm at a second position thereon spaced apart from the first position thereon; and
    a second connecting arm extending between the first arm and the second arm, the second connecting arm pivotably connected to a third position on the first arm disposed between the first and second positions thereon and pivotably connected to a position on the second arm spaced apart from the first position on the second arm;
    the assembly further comprising a guide assembly comprising an engagement member and a guide member, the engagement member connected to one of the first, second or third arms or one of the first or second connecting arms and moveable engaging with the guide member during at least part of the movement of the assembly from the retracted position to the extended position.

2. The assembly according to claim 1, wherein a length of the first arm and/or the second arm is no greater than a distance between the first and second fixed pivots.

3. The assembly according to claim 1, wherein the lengths of the first, second and third arms are substantially the same.

4. The assembly according to claim 1, wherein the position on the second arm at which the second connecting arm is connected to the second arm coincides with the second position on the second arm, such that the second connecting arm is connected to both the second and third arms.

5. The assembly according to claim 1, further comprising a fourth arm pivotably connected at a first position thereon to the first arm at a position on the first arm spaced apart from the first and third positions on the first arm.

6. The assembly according to claim 5, wherein a length of the fourth arm is the same as a length of the third arm.

7. The assembly according to claim 1, further comprising a locking assembly, wherein the locking assembly locks one arm of the assembly to another arm of the assembly.

8. The assembly according to claim 7, wherein the locking assembly locks together each of a pair of arms that are crossed in the extended position.

9. The assembly according to claim 1, further comprising a locking arm, wherein the locking arm is pivotably connected to an arm of the assembly.

10. The assembly according to claim 9, further comprising a support arm, the support arm being pivotably connected to the locking arm.

11. The assembly according to claim 10, wherein the engagement member comprises a first locking member.

12. The assembly according to claim 1, wherein the guide member is fixed relative to the arms of the assembly.

13. The assembly according to claim 12, wherein the guide member is mounted on the structure providing the first and second fixed pivots.

14. The assembly according to claim 1, wherein the guide member is mounted on the structure being moved by the assembly.

15. The assembly according to claim 1, wherein the engagement member comprises a pin.

16. The assembly according to claim 1, wherein the guide member comprises a guide surface, the engagement member engaging the guide surface.

\* \* \* \* \*